(12) United States Patent
Buchanan et al.

(10) Patent No.: US 11,656,156 B1
(45) Date of Patent: May 23, 2023

(54) AXLE-MOUNTED SENSOR CUFF APPARATUS FOR DETERMINING ANOMALIES ASSOCIATED WITH A RAILCAR WHEELSET, OR A RAILCAR BOGIE ASSEMBLY THAT THE RAILCAR WHEELSET IS PART OF, OR A TRACK

(71) Applicant: BALANCED ENGINEERING SOLUTION, LLC, Towson, MD (US)

(72) Inventors: Stephen T. Buchanan, Landenberg, PA (US); Eric L. Canfield, Downingtown, PA (US)

(73) Assignee: BALANCED ENGINEERING SOLUTION, LLC, Towson, MD (US)

( * ) Notice: Subject to any disclaimer, the term of this patent is extended or adjusted under 35 U.S.C. 154(b) by 0 days.

(21) Appl. No.: 17/952,782

(22) Filed: Sep. 26, 2022

(51) Int. Cl.
  *G01M 17/10* (2006.01)
  *B61K 9/08* (2006.01)

(52) U.S. Cl.
  CPC ............... *G01M 17/10* (2013.01); *B61K 9/08* (2013.01)

(58) Field of Classification Search
  CPC ................................ G01M 17/10; B61K 9/08
  USPC .......................................................... 73/660
  See application file for complete search history.

(56) References Cited

U.S. PATENT DOCUMENTS

| | | | |
|---|---|---|---|
| 3,888,128 A | 6/1975 | Mitchell | |
| 5,443,537 A | 8/1995 | Haskins | |
| 6,595,053 B2 | 7/2003 | Parker | |
| 6,600,999 B2 | 7/2003 | Clark et al. | |
| 6,622,389 B1 | 9/2003 | Pellegrino | |
| 6,768,551 B2 | 7/2004 | Mian et al. | |
| 7,117,603 B1 | 10/2006 | Pellegrino | |
| 7,164,264 B2 | 1/2007 | Anderson et al. | |
| 7,213,789 B1 * | 5/2007 | Matzan | G01M 17/10 246/169 R |
| 7,478,482 B1 | 1/2009 | Pellegrino | |
| 7,578,066 B1 | 8/2009 | Pellegrino | |
| 7,705,743 B2 | 4/2010 | Barone et al. | |
| 7,926,189 B1 | 4/2011 | Pellegrino | |
| 8,305,567 B2 | 11/2012 | Hesser et al. | |
| 9,387,734 B1 | 7/2016 | Alhazmi | |

(Continued)

FOREIGN PATENT DOCUMENTS

| | | |
|---|---|---|
| EP | 3839468 A1 | 6/2021 |
| WO | 2021166412 A1 | 8/2021 |

OTHER PUBLICATIONS

Wikipedia entry for "Train wheel." Downloaded from web page: <https://en.wikipedia.org/wiki/Train_wheel>, download date: Jul. 11, 2022; page last edited: May 11, 2022, 4 pages.

(Continued)

*Primary Examiner* — Jacques M Saint Surin
(74) *Attorney, Agent, or Firm* — Panitch Schwarze Belisario & Nadel LLP

(57) ABSTRACT

An axle-mounted sensor cuff is configured to be removably attachable to a hub portion of a railcar wheel of a railcar wheelset for use in determining anomalies associated with the railcar wheel, or a railcar bogie assembly that the railcar wheelset is part of, or a track, during motion of the railcar wheelset on a track. The sensor cuff includes one or more sensors, such as inertial measurement units (IMU's), mounted thereto to measure parameters that are used for determining the anomalies during motion of the railcar wheel on the track.

16 Claims, 22 Drawing Sheets

(56) References Cited

U.S. PATENT DOCUMENTS

| | | | |
|---|---|---|---|
| 9,645,037 B2 | 5/2017 | Meyer et al. | |
| 9,771,090 B2 | 9/2017 | Warta et al. | |
| 9,981,671 B2 | 5/2018 | Fraser et al. | |
| 9,989,498 B2 | 6/2018 | Lanza di Scalea et al. | |
| 10,040,463 B2 | 8/2018 | Singh | |
| 10,124,819 B2 | 11/2018 | Ghosh et al. | |
| 10,284,752 B1 | 5/2019 | Canfield et al. | |
| 10,442,449 B2 | 10/2019 | Singh | |
| 10,543,861 B1 | 1/2020 | Bartek et al. | |
| 10,752,271 B2 * | 8/2020 | Chung | G06T 7/0004 |
| 10,953,899 B2 * | 3/2021 | Chung | B61L 23/044 |
| 10,969,292 B2 | 4/2021 | Canfield et al. | |
| 10,989,694 B2 | 4/2021 | Kawabata et al. | |
| 11,001,283 B2 | 5/2021 | Dick et al. | |
| 11,259,007 B2 | 2/2022 | Mesher | |
| 11,287,348 B2 | 3/2022 | Canfield et al. | |
| 11,480,999 B2 | 10/2022 | Foo et al. | |
| 2005/0247130 A1 | 11/2005 | Takada et al. | |
| 2006/0010992 A1 | 1/2006 | Shima et al. | |
| 2008/0185106 A1 | 8/2008 | Fariey et al. | |
| 2009/0314075 A1 | 12/2009 | Albohr et al. | |
| 2010/0139397 A1 | 6/2010 | Braghiroli et al. | |
| 2010/0288030 A1 | 11/2010 | Shin et al. | |
| 2013/0073224 A1 | 3/2013 | Oblizajek et al. | |
| 2014/0191525 A1 | 7/2014 | Ruebusch et al. | |
| 2017/0350684 A1 | 12/2017 | Maliszewski | |
| 2018/0003591 A1 | 1/2018 | Renegar et al. | |
| 2018/0029410 A1 | 2/2018 | Makary | |
| 2019/0064027 A1 | 2/2019 | Leone et al. | |
| 2019/0092106 A1 | 3/2019 | Abdossalami et al. | |
| 2020/0033220 A1 | 1/2020 | Raad et al. | |
| 2020/0385036 A1 * | 12/2020 | Schwarz | B61F 5/44 |
| 2021/0061027 A1 | 3/2021 | Da Deppo et al. | |
| 2021/0063267 A1 | 3/2021 | Canfield et al. | |
| 2021/0181063 A1 | 6/2021 | Dodani et al. | |
| 2021/0256782 A1 | 8/2021 | Ehlers | |

OTHER PUBLICATIONS

Product brochure for Road Force Elite® wheel balancer, Hunter Engineering Company, Copyright © 2018, 16 pages.

Ford F150 2004-2014 Center Cap, Copyright © 2019 CENTERCAPS.NET, 2 pages.

International Search Report and Written Opinion dated Oct. 27, 2020 in International Application No. PCT/US2020/044692.

Bee Line, on vehicle wheel balancing, www.beeline-co.com/products/wheel-balancing, 2 pages (2021).

Tru Align: The Universal Wheel Alignment Adapter Kit. Printout from Wayback Machine web page: <https://web.archive.org/web/20190820155325/https://trualign.com/>, printout date: Apr. 1, 2021, web page captured on Aug. 20, 2019,10 pages.

International Preliminary Report on Patentability dated Aug. 25, 2021 in International Application No. PCT/US2020/044692.

Bee Line, on vehicle wheel balancing, www.beeline-co.com/products/wheel-balancing, 5 pages (2021).

Yosoo Wheel Balancer Kit. Amazon ASIN #B08R9PCHZT, date first available on Amazon: Dec. 25, 2020, 5 pages.

* cited by examiner

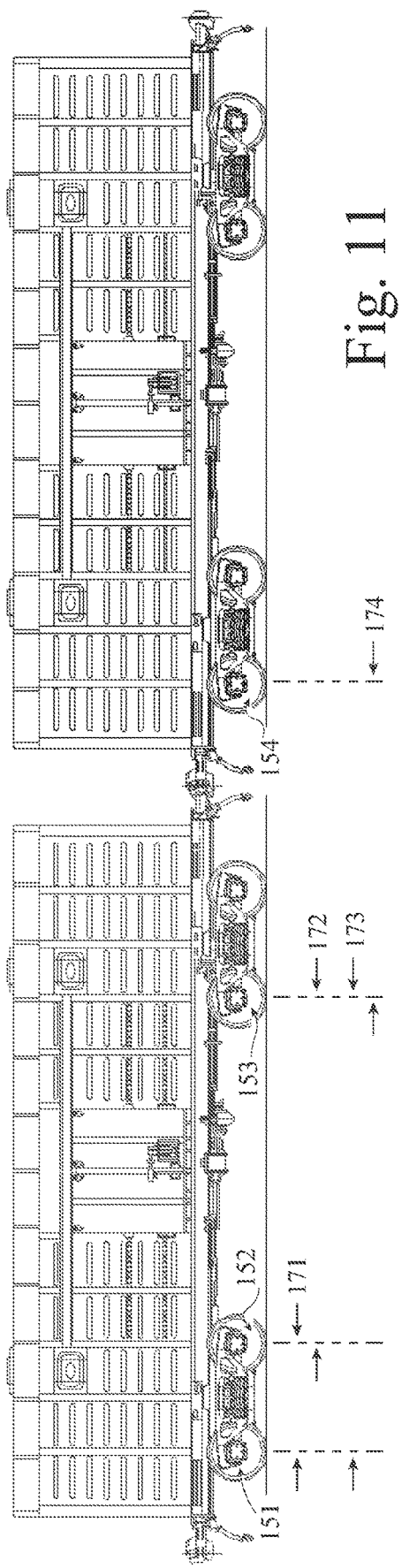

AXLE-MOUNTED SENSOR CUFF APPARATUS FOR DETERMINING ANOMALIES ASSOCIATED WITH A RAILCAR WHEELSET, OR A RAILCAR BOGIE ASSEMBLY THAT THE RAILCAR WHEELSET IS PART OF, OR A TRACK

CROSS-REFERENCE TO RELATED APPLICATIONS

This application is related to U.S. patent application Ser. No. 17/952,787 filed Sep. 26, 2022 entitled "Wheel-mounted sensor ring apparatus for determining anomalies associated with a railcar wheelset, or a railcar bogie assembly that the railcar wheelset is part of, or a track."

BACKGROUND OF THE INVENTION

A railcar bogie, also referred to as a railroad truck or wheel truck, is a structure underneath a railway vehicle. Components of a railcar bogie include the bogie frame, suspension parts, and at least one railcar wheelset which includes wheel bearings. Railcar wheels are attached to a fixed axle so that both wheels rotate at the same time. The combination of the railcar wheels and the axle is referred to as the railcar wheelset.

Similar to motor vehicle wheels, railcar wheels experience positional and vibrational anomalies during motion of the railcar wheels.

Every year, millions of dollars in damage and thousands of injuries are caused by mechanical failures in railcar bogies and rail track. According to the Federal Railroad Administration (FRA), between 1975-2021, there were 54,807 derailments, $4.9 billion of damage, and 3,181 injuries of which 62 were fatalities. Mechanical failures are due to anomalies that can occur in bogies and track during production or during operation. Anomalies can go unnoticed until they cause derailments and accidents.

Inspections

Inspections of the rail and wheels can only detect the anomalies that are present during inspection and therefore can miss catastrophic anomalies that could occur between inspections. Inspections of the tracks for deformities include identifying changes in profile/loss in material ("flat head"). Such inspections are costly and time consuming and are typically performed with integrated car/trains. ENSCO Inc. is one such company that specializing in inspection technology, such as the 2D Laser system for rail inspection described in U.S. Pat. No. 11,001,283 (Dick et al.). While inspection vehicles work, there is a maximum speed at which they can accurately scan the track for anomalies which means not only will the whole line be closed while inspection occurs, but the inspection itself will take significant time to perform and thus will be very costly.

Various types of integrated technology are in these systems such as lasers and cameras to measure geometries of track and sometimes ballasts, ultrasonic wave generators and sensors to measure internal flaws as well as geometries (e.g., U.S. Pat. No. 9,989,498 (Lanza di Scalea et al), and even magnetic field generators for very precise measurement of material flaws (e.g., (U.S. Pat. No. 10,989,694 (Kawabata et al). There can also be the use of LiDAR, RADAR, and heat sensors, such as described in U.S. Pat. No. 9,771,090 (Warta et al.). U.S. Pat. No. 11,259,007 (Mesher) assigned to Tetra Tech, Inc. discloses a 3D track bed assessment system using light detection to measure the elevation of the bed and crosstie inspection. U.S. Pat. No. 9,981,671 (Fraser et al.) assigned to NORDCO also has an integrated inspection system which includes an inspection vehicle which is a normal road vehicle modified for track use.

Inspecting wheels and rolling stock requires pulling the railcar off the line and going over all parts in a designated inspection yard. The total number of inspection yards and, consequently, their ability to inspect current rolling stock is on the decline.

Wayside Inspection Technology

Another option for anomaly detection is the use of wayside inspection technology. This uses similar technology as inspection vehicles, except that the inspection equipment is permanently installed next to rail tracks and is used to either measure track deformation underload, or to scan physical parameters of trains as they pass, such as wheel deformation and bearing conditions. Some systems, such described in the U.S. Pat. No. 10,124,819 (Ghosh et al.) assigned to General Electric Corporation, are integrated into the track and sense wheel deformities as wheels pass on the track. Similarly, U.S. Pat. No. 8,305,567 (Hesser et al.) assigned to Progress Rail Services Corp., provides a rail sensing apparatus which senses rail vertical and/or lateral displacement/loads, and can provide information regarding the condition of the rail vehicle, such as bearing condition and wheel fatigue. Some systems are installed adjacent to the tracks and use piston-like sensors to measure track deformation, such as U.S. Pat. No. 10,543,861 (Bartek et al.) assigned to Focused Technology Solutions, Inc. Other systems use light or other such sensors installed by the track to scan the train bogies as they pass. See, for example, U.S. Pat. No. 6,768,551 (Mian et al.) assigned to International Electronic Machines Corp., and wayside scanners that perform bogie condition monitoring and hunting detection of passing trains, produced by companies such as Wayside Inspection Devices located in Rigaud, Quebec, Canada.

Wayside solutions can be a better alternative to traditional inspection due to their ability to inspect any train that passes during normal operation, reducing the cost of manual inspection of railcar and avoiding the need to bring the train out of operation and into the yard. However, their main drawback is the lack of real-time condition monitoring of trains, and only being able to inspect cars as they pass the dedicated section in track. They are also not able to assess track conditions in locations outside their dedicated sensing range.

On Car Solutions (Monitoring Devices)

Some companies seek to get around the fabrication and operation costs of a dedicated vehicle. Some companies produce inspection-style equipment that can be mounted onto any car, thereby avoiding the cost of a dedicated vehicle for inspection, while achieving real-time data collection. One such device is described in U.S. Pat. No. 10,040,463 (Singh) entitled "Railroad Track Survey System" that comprises track scanning sensors which could include such technologies as those described in the inspection vehicles discussed above, and which can be mounted between bogies under any railway vehicle in use. Other solutions can even replace traditional parts in bogies, such as U.S. Pat. No. 7,164,264 (Giai et al.) assigned to Aktiebolaget SKF, which describes replacement of the current journal bearing with a sensor integrated bearing. However, these solutions are permanent as they are hard-mounted to cars or replace components, and thus require installation time in the shop by a technician. As such, there is no prior art solution that can be removably attached or attached to the bogie without bringing the bogie into the yard/shop to affix the device and that can be installed without a dedicated technician. The largest drawback in these semi-permanent systems is that these systems are not removable/adjustable, and the operators need to decide which car/bogies to monitor, while an easily removable and adjustable option would allow for a rotation of the system allowing for all bogies to be monitored at some point, or for the system to be entirely moved to a new fleet.

Sensor Systems

Various sensor systems have been developed for railcars. U.S. Pat. No. 7,705,743 (Barone et al.) assigned to L-3 Communications Corporation entitled "Self-assembling wireless network, vehicle communications system, railroad wheel and bearing monitoring system and method thereof" discloses a wireless network of sensors installed on a railcar fleet that uses rotation generators for continuous power. Sensors can be added depending on the parameters desired to be measured. An operator is warned of any issues detected. The system components are bolted onto axles. Another such system described in U.S. Pat. No. 10,442,449 (Singh) assigned to Rail Vision Europe Ltd., discloses a system of sensors integrated into the bogie with a focused-on data acquisition and ongoing monitoring of components with consideration for data transmission and analysis. However, neither of these systems are easily and removably attached to a railcar fleet.

In sum, there is no system that has mastered the concept of being removably attached for advanced on-board real-time monitoring of railway car bogie components anomaly detection and failure prevention, as well as railway track for anomaly detection.

Despite the myriad of industry solutions described above, there is still an unmet need for a technology to detect such anomalies that relies upon removably attachable apparatus that can be moved from railway vehicle to railway vehicle easily and quickly. The present invention addresses this need.

SUMMARY OF THE PRESENT INVENTION

In one preferred embodiment (axle-mounted embodiments), the present invention provides an apparatus configured to be removably attached to a railcar bogie assembly via the wheelset for use in determining real-time vibration forces caused by anomalies in the wheel, bogie assembly and track during operation. The apparatus includes two sides of a clamp, a hinge, a compressible spacer, magnets, and three or more sensors such as inertial measurement unites (IMU's). The two sides of the clamp are connected via the hinge, which allows the apparatus to open and enclose around the axle, and firmly secured by magnets on the open side once in place. The compressible spacer allows for the molding of the apparatus to any class of axle. The three or more sensors are mounted to the outside face of the clamp and are configured to measure parameters that are used for calculating the vibration forces during motion of the vehicle.

In a second preferred embodiment (wheel-mounted embodiment), the present invention provides an apparatus with the same configuration which includes two sides of a clamp, a hinge, magnets, and three or more sensors. The two sides of the clamp are connected via the hinge, which allows the apparatus to open and enclose around the axle. The clamp is firmly closed by magnets on the open side once around the axle and magnets on the inner face of the clamp are used to secure the clamp to the wheel. The high strength magnets on the wheel face inhibit the apparatus from coming off of the wheel when the vehicle is in motion.

The different embodiments are also collectively referred to herein as "sensor devices," and as described below, each sensor device includes one or more sensors, such as inertial measurement units (IMU's).

In use, the different embodiments of the apparatuses (referred to herein in the singular) are removably attached to an axle and/or wheel of a wheelset assembly of a train bogie. The train is then driven on a track in normal operation, and during motion of the vehicle, parameters measured by the one or more sensors (e.g., IMU's) mounted to the apparatus are collected, and then subsequently used for analyzing and determining positional and vibrational anomalies during motion of the railcar wheels.

BRIEF DESCRIPTION OF THE DRAWINGS

Preferred embodiments of the present invention will now be described by way of example with reference to the accompanying drawings:

FIG. 11 shows Data Synchronization of the system and its capability as a track monitoring system.

DETAILED DESCRIPTION OF THE INVENTION

Certain terminology is used herein for convenience only and is not to be taken as a limitation on the present invention.

The words "a" and "an", as used in the claims and in the corresponding portions of the specification, mean "at least one."

The discussion below refers to "vibrations" and "translational vibrations." Some vibrations are the result of translational forces, whereas other vibrations are not the result of translational forces. The present invention determines the presence of one or more "vibrational anomalies." In one embodiment, the vibrational anomaly or anomalies are those associated with the railcar wheel and a railcar bogie assembly that the railcar wheel is part of, during motion of the railcar wheelset on a track.

The various embodiments described below each make use of one or more IMU's. Any IMU may be used that has a form factor and durability suitable for the environment described herein. One suitable IMU is the IMU described in U.S. Pat. No. 10,284,752 (Canfield et al.), which is incorporated herein by reference. Sample measured parameters, which are used for calculating the positional and vibrational anomalies during motion of the railcar wheel, are captured by one or more IMU's. These parameters include, but are not limited to, linear acceleration and angular velocity.

For ease of illustration, certain figures show both the axle-mounted embodiment and the wheel-mounted embodiment in relation to the bogie. However, in operation, either one or both embodiments would be used for anomaly detection.

I. Detailed Description

Figure 1A:
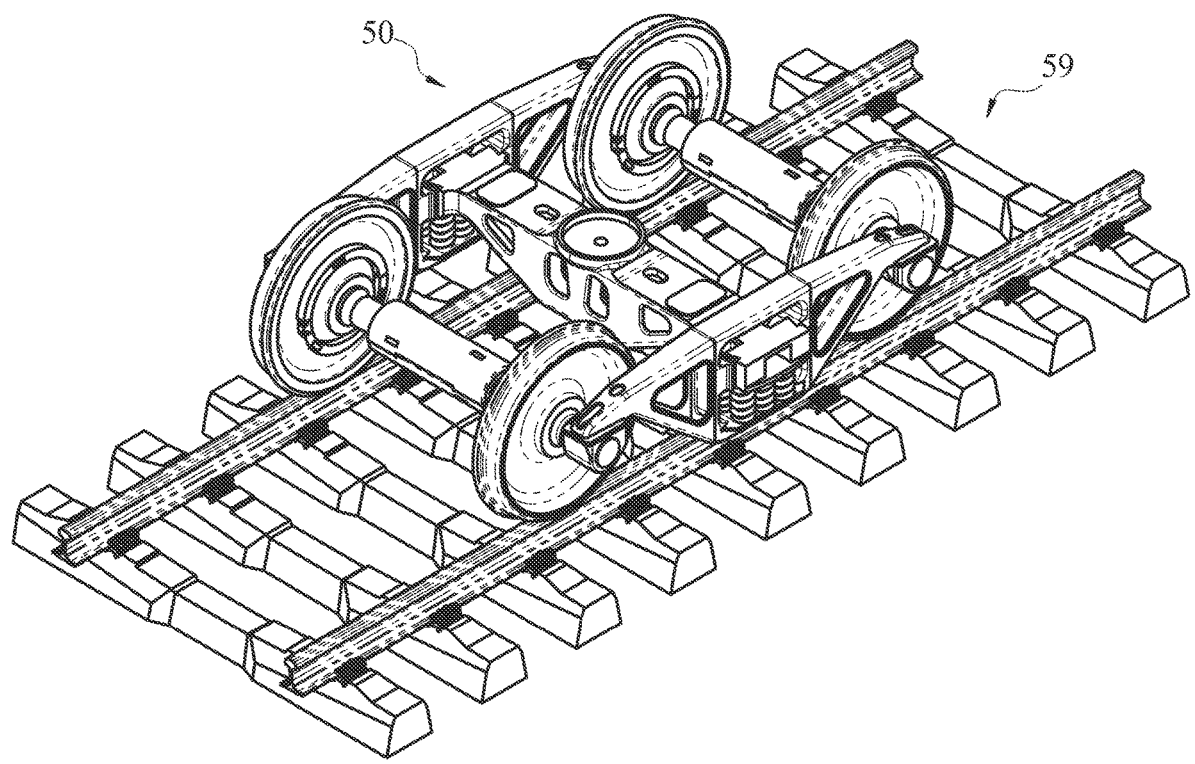
FIGS. 1A and 1B are views of a bogie with two different embodiments of the apparatus on a rail.
Figure 1B:
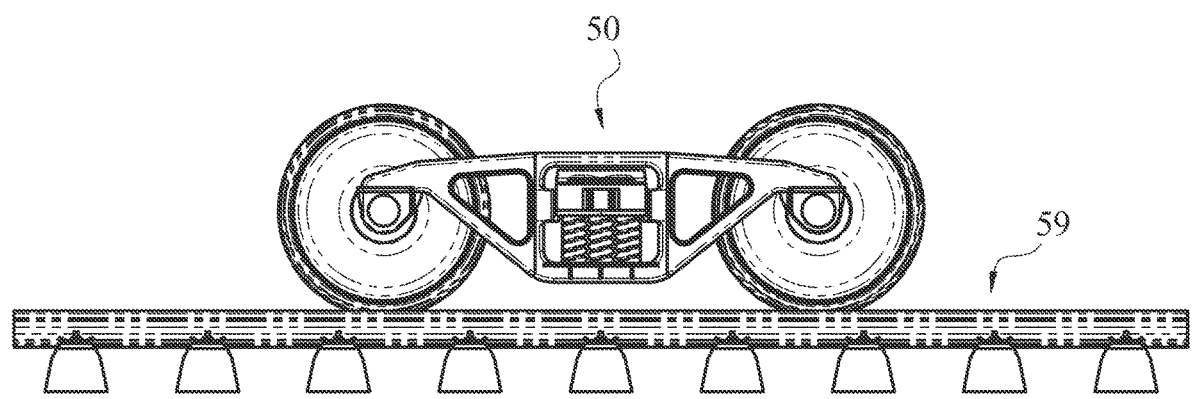

FIGS. 1A and 1B show two views of a bogie 50 on a rail (track) 59. One of the axle-mounted embodiments and the wheel-mounted embodiment are visible in FIG. 1A, however both are hidden from view in FIG. 1B. As discussed below and illustrated in the figures, the axle-mounted embodiments are referred to as a single axle-mounted sensor cuff 100 and a split axle-mounted sensor cuff 120, and the wheel-mounted embodiment is referred to as a wheel-mounted sensor ring 90.

Figure 2A:
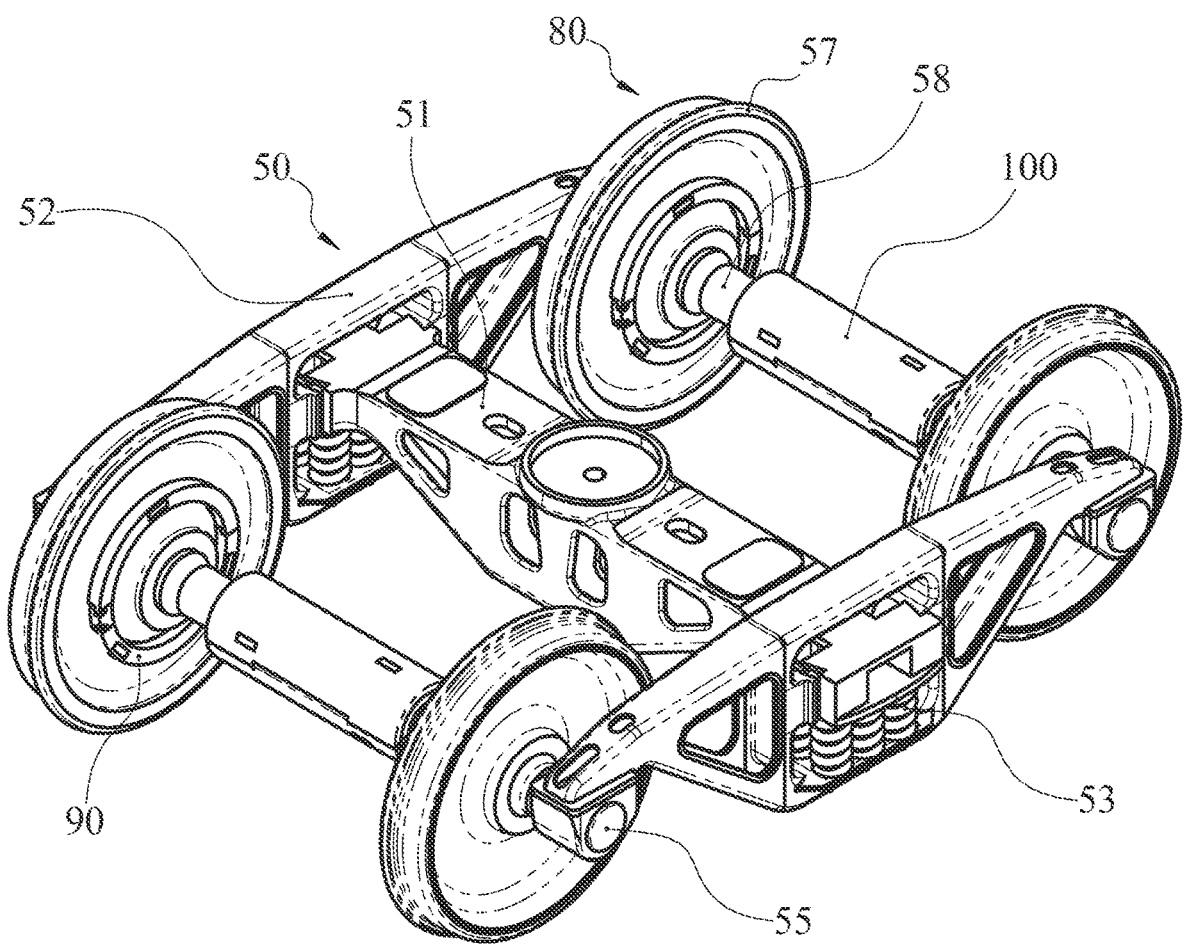
FIGS. 2A and 2B show respective isometric and exploded views of the bogie with two different embodiments of the apparatus.
Figure 2B:
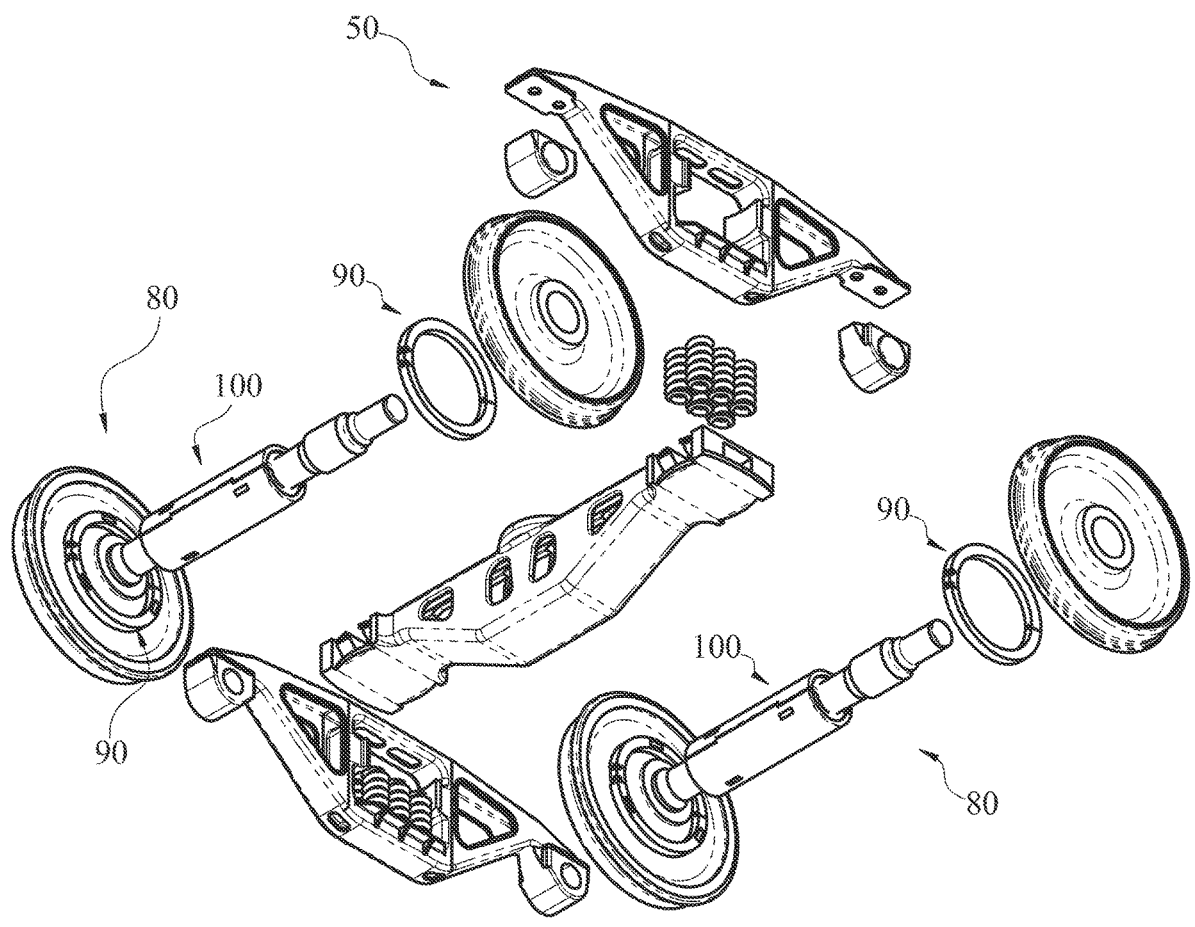

FIG. 2A shows a conventional bogie 50 that includes bolster 51, side frames 52, suspension 53, and journal box bearings 55. FIG. 2A also shows a wheel-mounted sensor ring 90 on each wheel of the bogie 50, as well as a single axle-mounted sensor cuff 100 on each axle of the bogie 50. FIG. 2B shows an exploded view of the bogie 50 allowing for a more detailed view of where the wheel-mounted sensor rings 90 and the single axle-mounted sensor cuffs 100 are located with respect to the rest of the bogie 50.

Figure 3A:
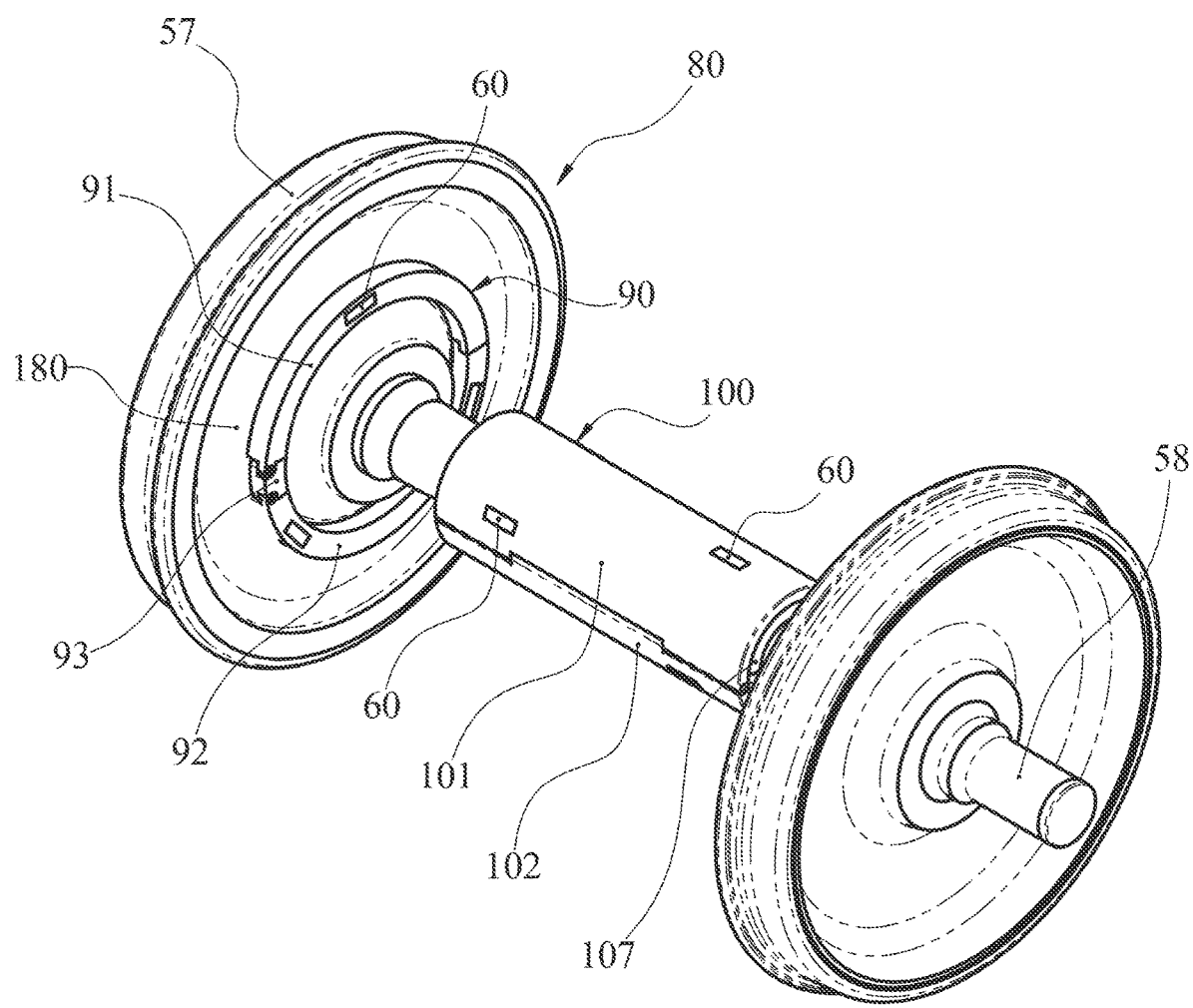
FIGS. 3A and 3B are different views of a bogie wheelset with two different embodiments of the apparatus.
Figure 3B:
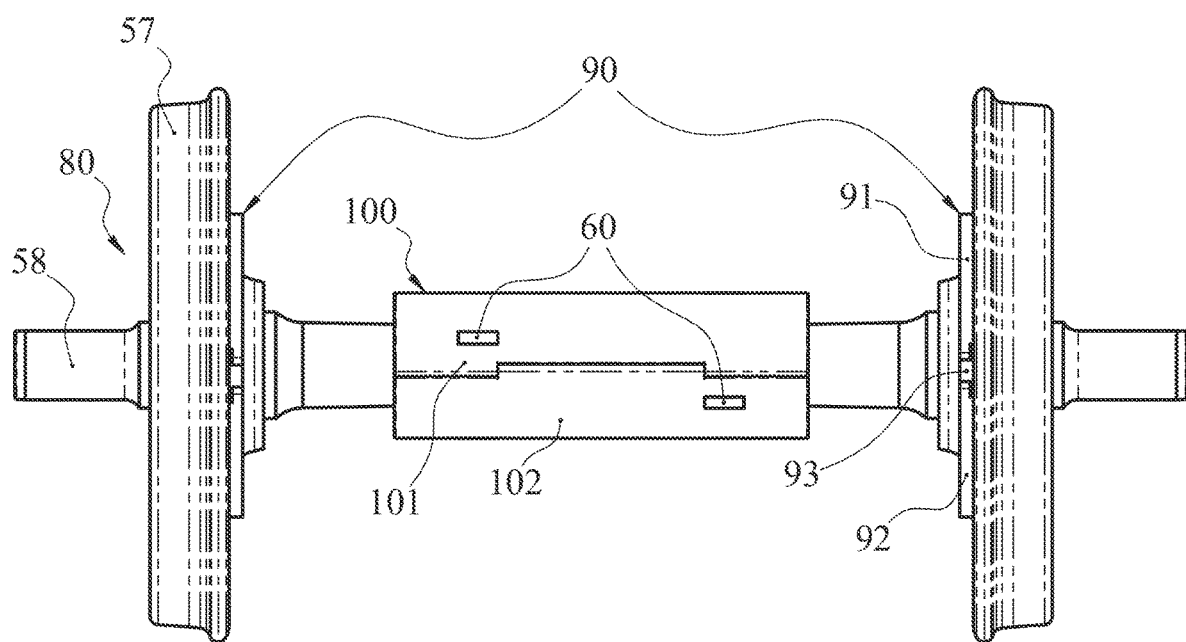

FIGS. 3A and 3B show two different views of the wheel-mounted sensor rings 90 mounted to respective wheels 57 of the wheelset 80, and the single axle-mounted sensor cuff 100 clamped around the axle 58. FIG. 3A shows that the wheel-mounted sensor ring 90 is concentrically spaced from the axle 58. FIG. 3B shows a front view of the wheelset 80 and illustrates that the single axle-mounted sensor cuff 100 is preferably centered on the axle 58.

Referring to FIG. 3A, the wheel-mounted sensor ring 90 is removably attachable to a hub portion 180 of the wheel 57. As is well-known in the art, a railcar wheel 57 includes a hub portion having an axle bore (axial through-hole) for receipt of an axle. The hub portion is typically tapered (the tapering is not illustrated in FIG. 3A), thereby allowing the wheel-mounted sensor ring 90 to be naturally centered so that it is concentrically spaced from the axle 58. The hub portion 180 of the wheel 57 may also be characterized as being part of the inside facing surface of the wheel 57.

Figure 6A:
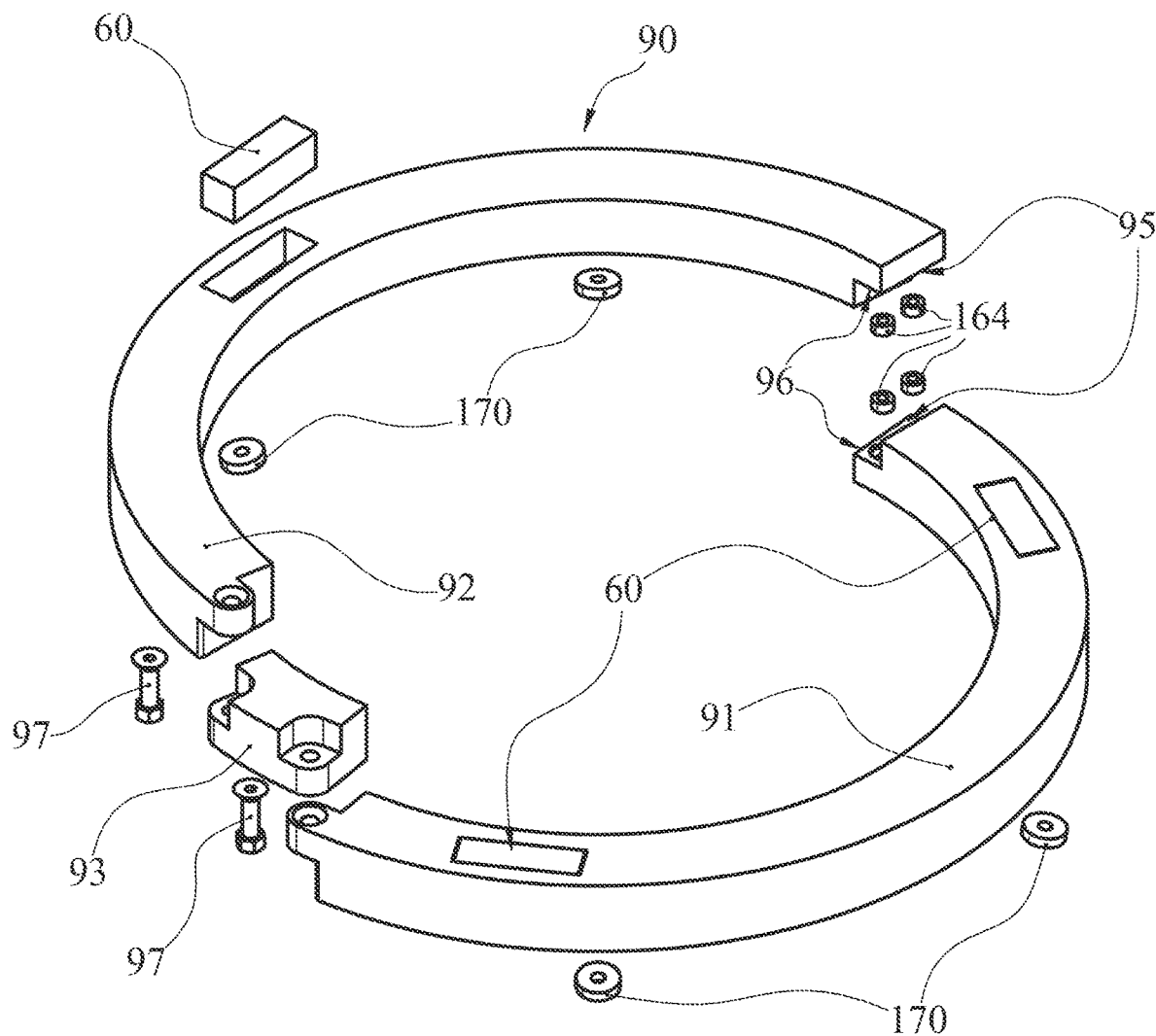
FIG. 6A is a component view of one embodiment of a wheel-mounted apparatus as shown in FIGS. 5A and 5B.
Figure 6B:
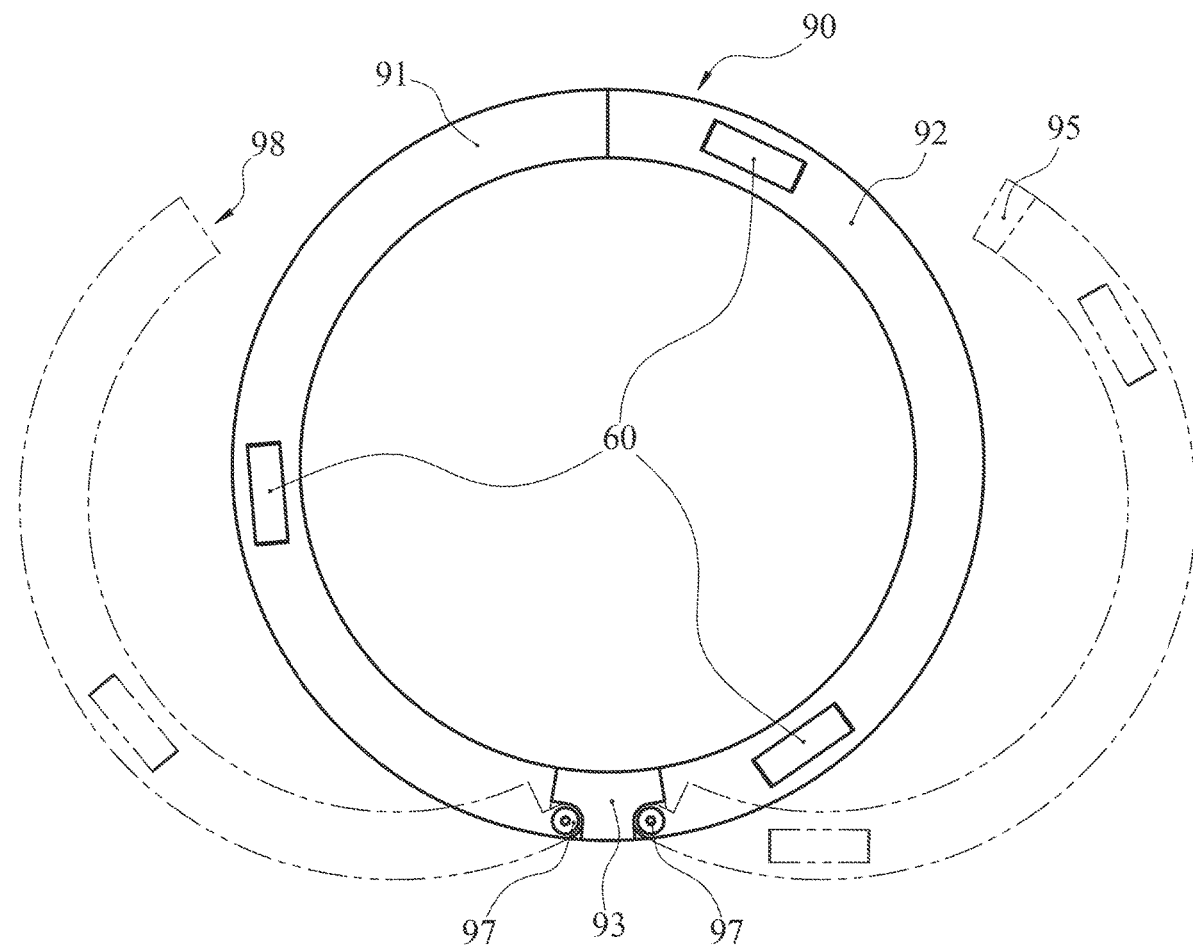
FIG. 6B is a component view showing the operation of one embodiment of the wheel-mounted apparatus in its closed and open states which would open to allow for the apparatus to go around the axle.

FIG. 6A shows the wheel-mounted sensor ring 90 by itself. The wheel-mounted sensor ring 90 includes two sides 91 and 92 (interchangeably referred to herein as "a first semicircular portion 91" and "a second semicircular portion 92", respectively, each having a half-ring shape) attached to a ring hinge 93 on one end via hinge pin bolts 97 and attached on the other side to each other by a magnet clamp 95. One end of each of the sides 91 and 92 has a lip region 96 which have magnets 164 (which form the magnet clamp 95) mounted thereto in recesses of the lip regions 96. The lip regions 96 mate with each other via the magnet clamp 95 to form a ring shape. The wheel-mounted sensor ring 90 includes three IMU's 60 (an IMU may also be referred to as an "IMU sensor"). Each IMU 60 is placed 120 degrees apart allowing for optimal coverage of the wheel 57. This configuration results in one IMU being mounted to side 91 and two IMU's being mounted to side 92. However, the configuration may also be reversed wherein two IMU's are mounted to side 91 and one IMU is mounted to side 92. The IMU's 60 are rigidly attached to the wheel-mounted sensor ring 90 in such a way as to rotate with the wheel 57 during normal operation. The IMU's 60 are preferably mounted inside of respective recesses of the sides 91 and 92, or are mounted flush against the outer surfaces of the male and female sides 101 and 102. FIG. 6B shows the wheel-mounted sensor ring 90 in an open configuration 98 for fitting over the axle as opposed to the closed configuration (labeled as wheel-mounted sensor ring 90) when clamped on the wheel. In the closed configuration, the wheel-mounted sensor ring 90 forms a circular ring or disk.

Figure 6C:
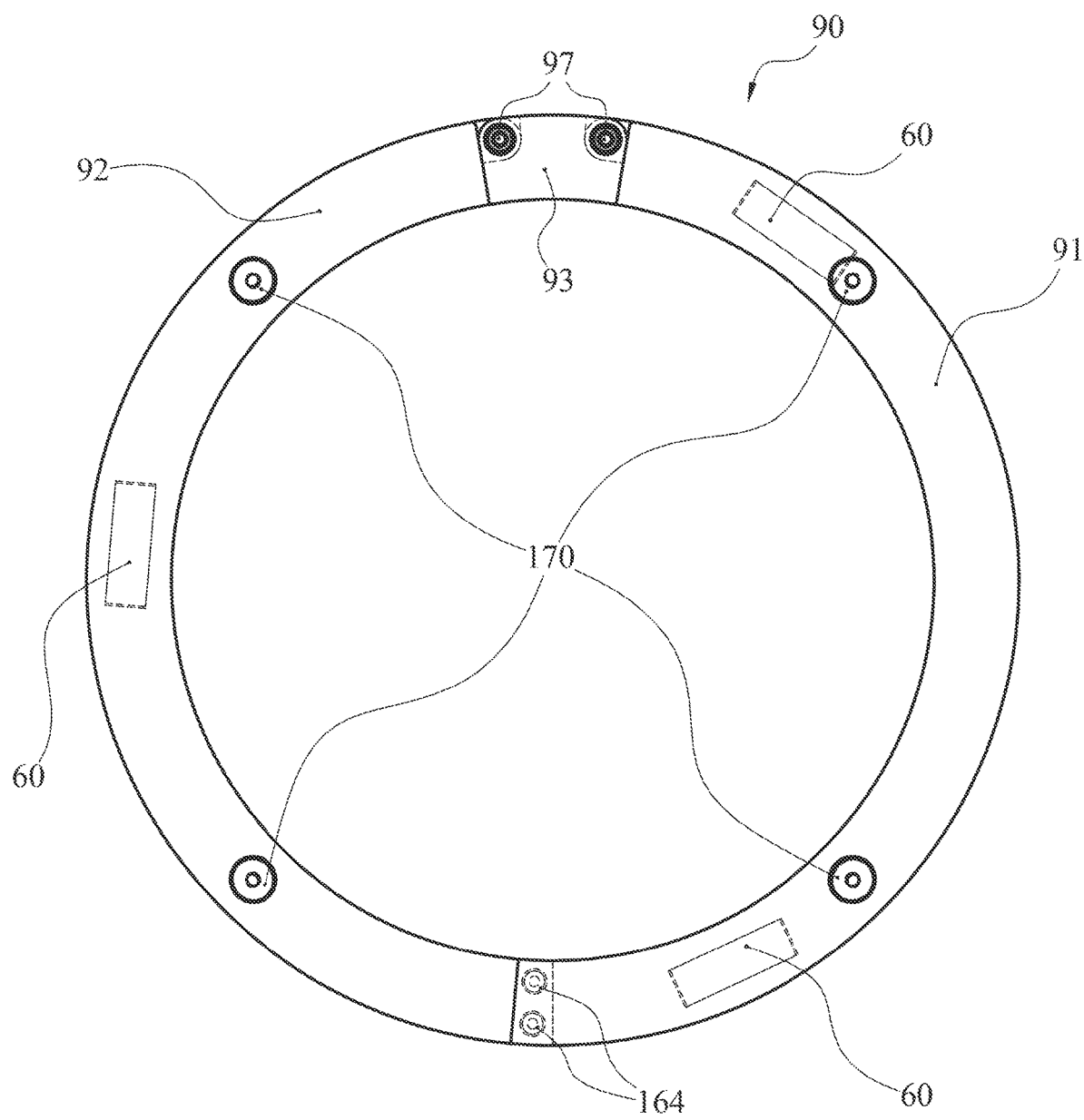
FIG. 6C is an additional view of the wheel-mounted embodiment of the apparatus.

FIG. 6C shows magnets 170 on the underside (flip side) of the wheel-mounted sensor ring 90 (the side opposite of the side that has the IMU's 60 are mounted thereto) that engage the hub portion of the railcar wheel 57. FIG. 6C also shows individual magnets 164 of the magnet clamp 95 attached to the lip regions 96 of the respective sides 91 and 92. FIG. 6C also shows an assembled view of the hinge pin bolts 97 of the ring hinge 93.

Figure 5A:
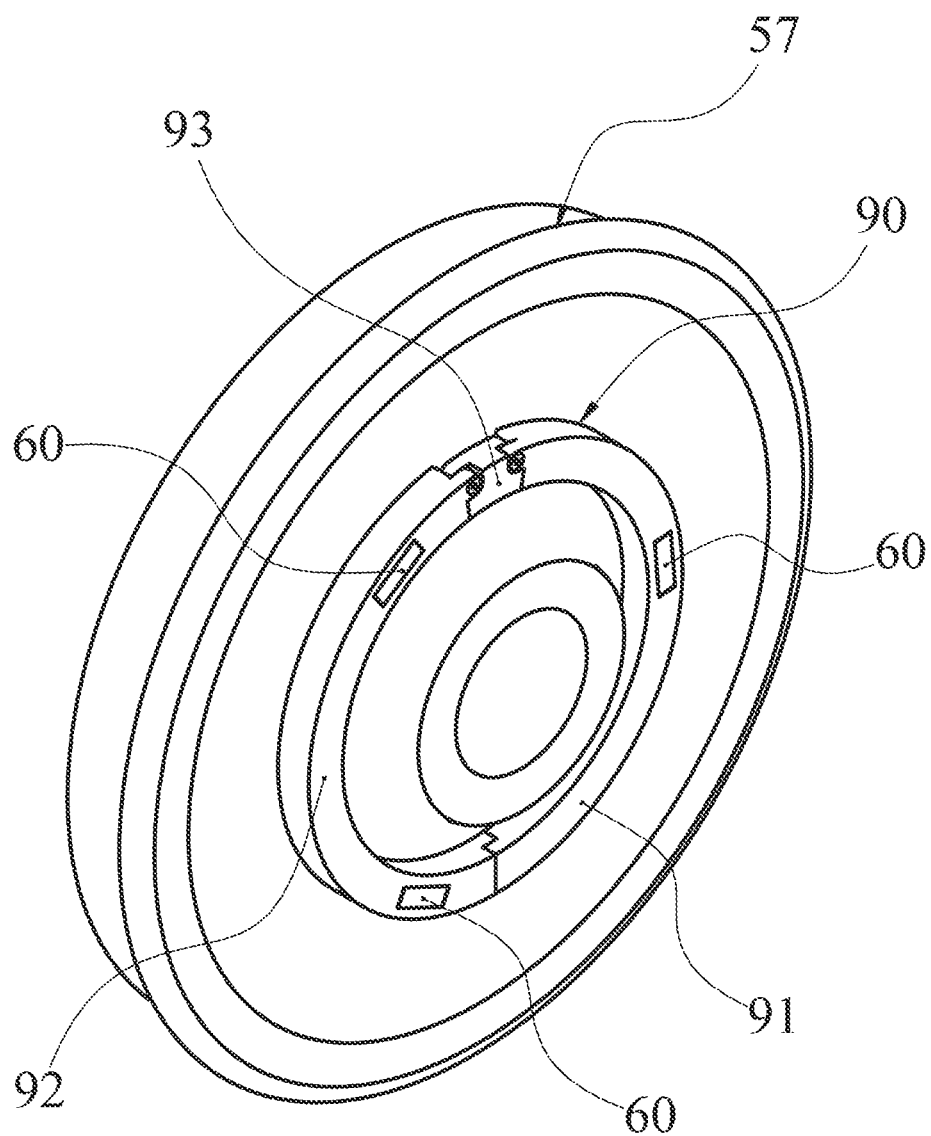
FIGS. 5A and 5B are different views of a wheel showing a wheel-mounted embodiment of the apparatus attached thereto.
Figure 5B:
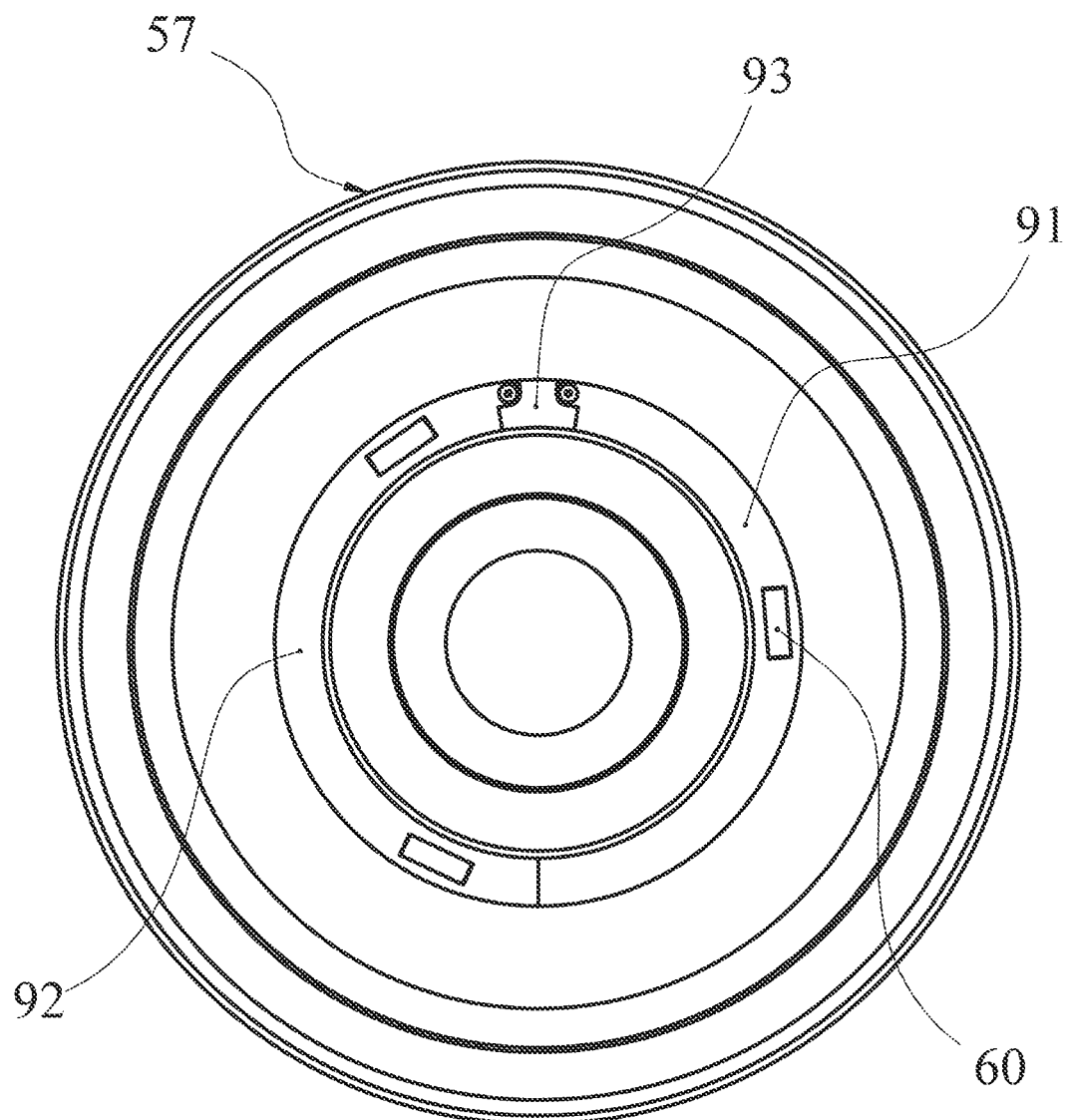

FIGS. 5A and 5B show the wheel-mounted sensor ring 90 on the wheel 57 in an isometric view (FIG. 5A), and a front view (FIG. 5B).

Figure 4A:
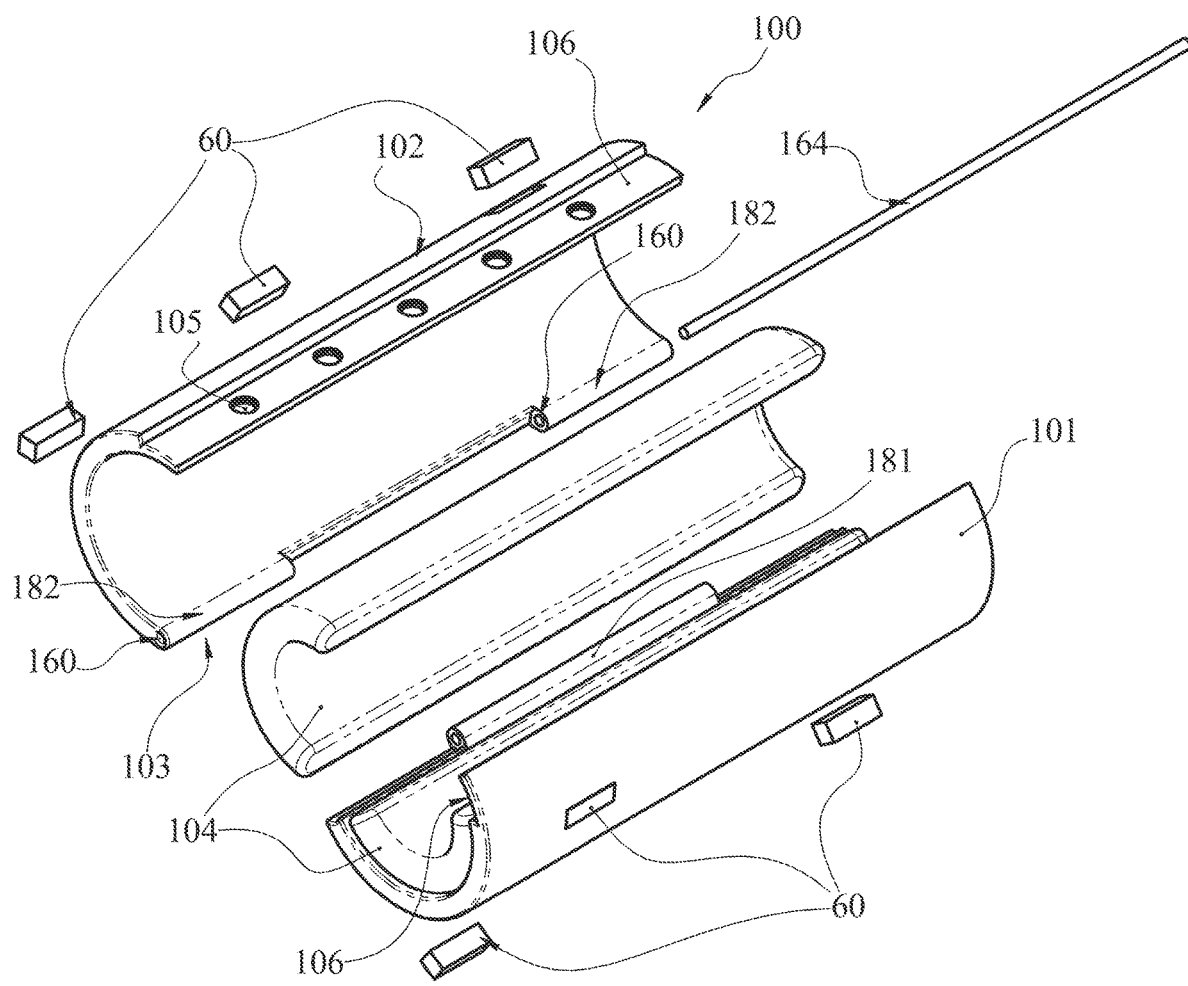
FIG. 4A is an exploded component view of one embodiment of an axle-mounted embodiment of the apparatus.

FIG. 4A shows an exploded view of an embodiment of the apparatus as a cuff placed around the axle 58, namely, the single axle-mounted sensor cuff 100. The single axle-mounted sensor cuff 100 is comprised of a male side 101 and a female side 102 (interchangeably referred to herein as "a first half cylinder cuff 101" and "a second half cylinder cuff portion 102, respectively) hinged together with a hinge 103 and clamped with magnets 105. One end of each of the male and female sides 101 and 102 has a lip region 106 along the edges. The lip regions 106 mate with each other to form a cylinder shape. The single axle-mounted sensor cuff 100 has two sets of three IMU's 60 located near each end of the cuff 100. In each set, the IMU's 60 are spaced 120 degrees apart to maximize capture ability of the sensors. This configuration results in one IMU for each set being mounted to the female side 102 and two IMU's for each set being mounted to the male side 101. However, the configuration may also be reversed wherein two IMU's for each set are mounted to the female side 102 and one IMU for each set is mounted to the male side 101. The IMU's 60 are preferably mounted inside of respective recesses of the male and female sides 101 and 102, or are mounted flush against the outer surfaces of the male and female sides 101 and 102. The IMU's 60 of each set are also preferably positioned in the same plane perpendicular to the axle 58 of the railcar wheelset 80.

Figure 4B:
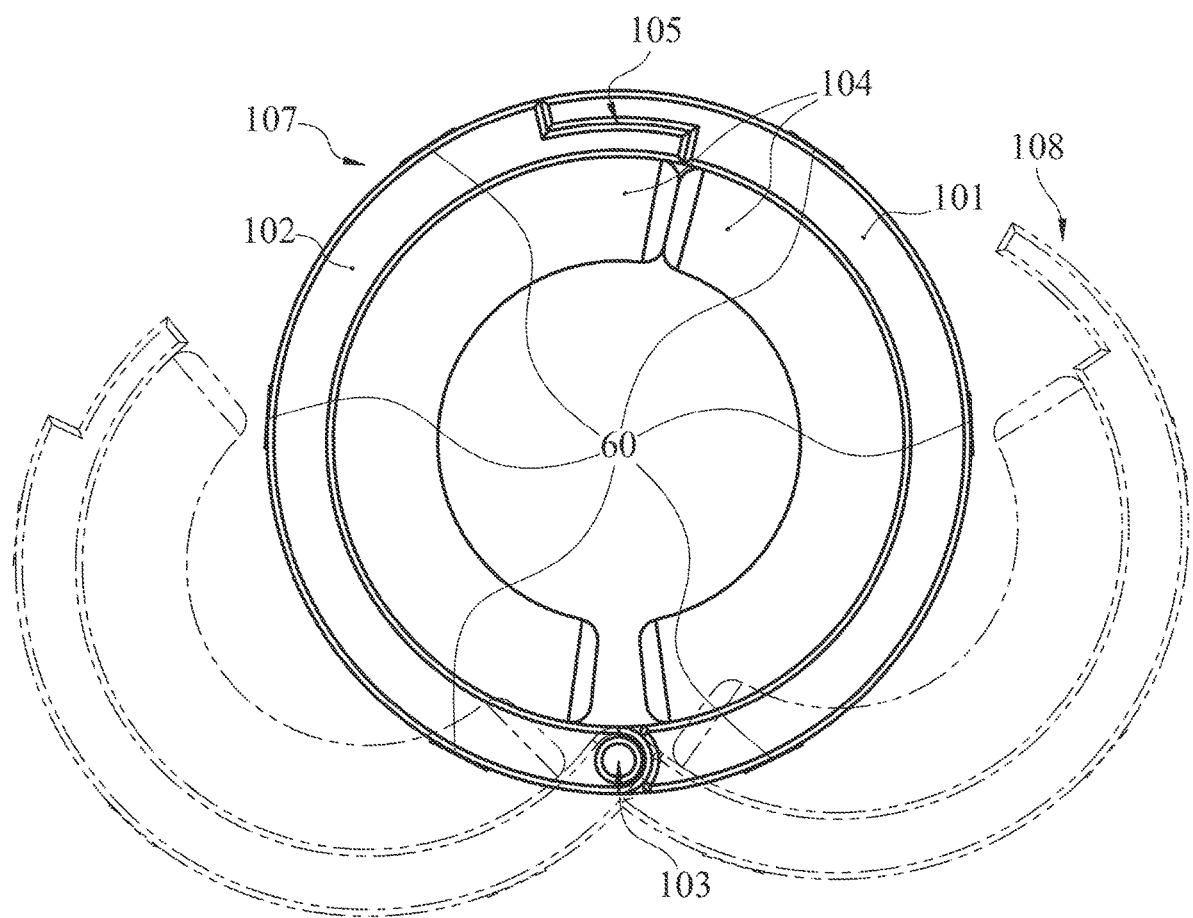
FIG. 4B is a view of a wheel-mounted embodiment of the apparatus showing the operation of the cuff in its closed and open states which would allow the apparatus to clamp over the axle.

The single axle-mounted sensor cuff 100 also has a compressible spacer 104 that allows for the cuff 100 to have equal spacing for all Association of American Railroads (AAR) axle thicknesses. FIG. 4B shows the cuff 100 in operation configurations, in both an open configuration 108 for fitting over the axle 58 and in a closed configuration 107 when the cuff 100 is compressed into place around the axle 58. The compressible spacer 104 is constructed of two parts (two halves), one part which fits against an inside surface of the male side 101, and another part which fits against an inside surface of the female side 102. The two halves are interchangeably referred to herein as "a first half cylinder cuff spacer" and "a second half cylinder cuff spacer." When the cuff 100 is compressed into place around the axle 58, the compressible spacer 104 will have a radial diameter which depends upon its degree of compression. The compressible spacer 104 may thus be characterized as having a first thickness or first radial diameter in a completely uncompressed state, and a second thickness or second radial diameter in its most compressed state, and a range of thicknesses or radial diameters between the first and second thicknesses or radial diameters depending upon how much compression is applied when the cuff 100 is compressed into place around the axle 58.

The combination of the compressible spacer 104 and the magnets 105 provide a friction-fit of the single axle-mounted sensor cuff 100 around the axle 58 so that the single axle-mounted sensor cuff 100 rotates with the axle 58 and does not slip with respect to the axle 58 during motion of the wheels 57. The compressible spacer 104 also acts as a dampening element to decrease sensor shock.

The two parts of the compressible spacer 104 need not be permanently attached to the respective male and female sides 101 and 102 of the cuff 100 which they abut against. For example, it may be desirable to use an easily removable fastening material such as a hook and loop fastener (e.g., Velcro®) to secure the two parts of the compressible spacer 104 to the respective male and female sides 101 and 102 of the cuff 100 which they abut against. In this manner, the cuff 100 may be moved from railcar to railcar having the same diameter hubs, and attached thereto, with less assembly steps because it would not be necessary to insert the compressible spacer 104 during each attachment process.

Figure 4C:
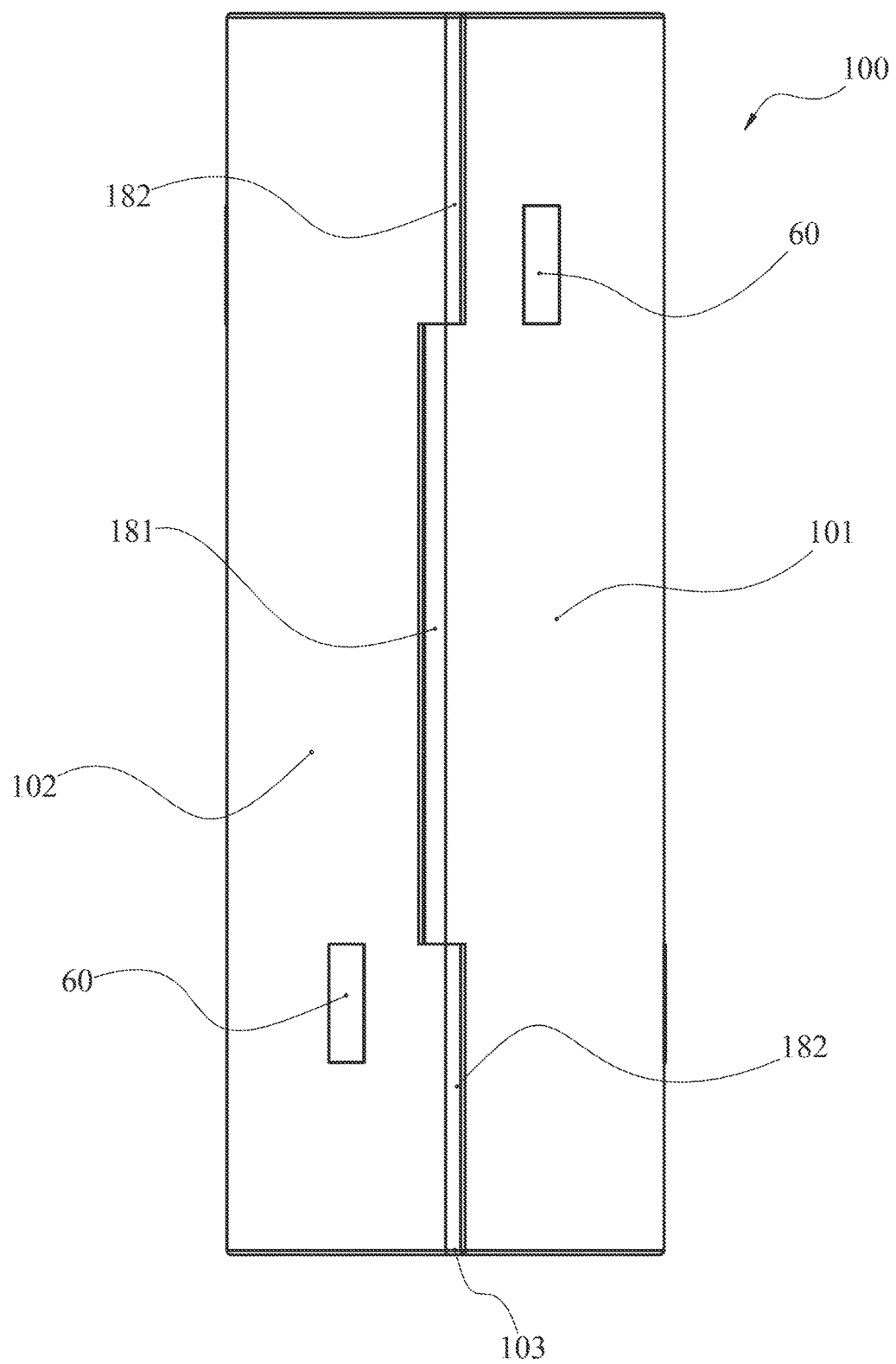
FIGS. 4C and 4D are additional views of the axle-mounted embodiment of the apparatus.

FIG. 4C shows a view of the hinge 103, which includes pin holes 160 and a hinge pin 162 that is placed through the pin holes 160 to secure the hinge 103. In one preferred embodiment, the hinge 103 has similar parts to a conventional door hinge wherein a hinge pin (here, hinge pin 162) extends through mating shafts of two adjoining parts, here, two ear-shaped extensions of female side 102 labeled as hinge ears 182, and one ear-shaped extension of male side 101, labeled as hinge ear 181.

Figure 4D:
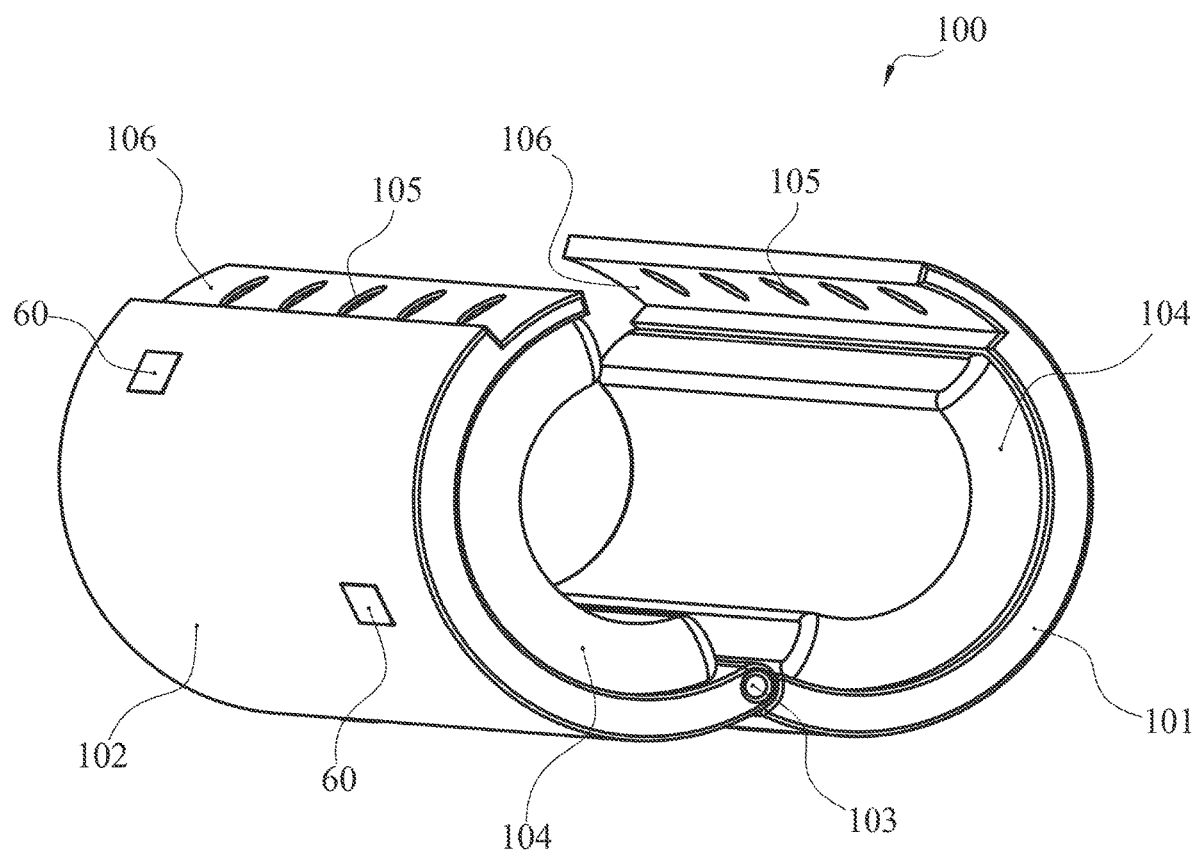

FIG. 4D shows a view of the magnets 105 on an underside lip of male side 101 which engage the magnets 105 on the female side 102, thereby forming a magnet clamp.

Figure 7A:
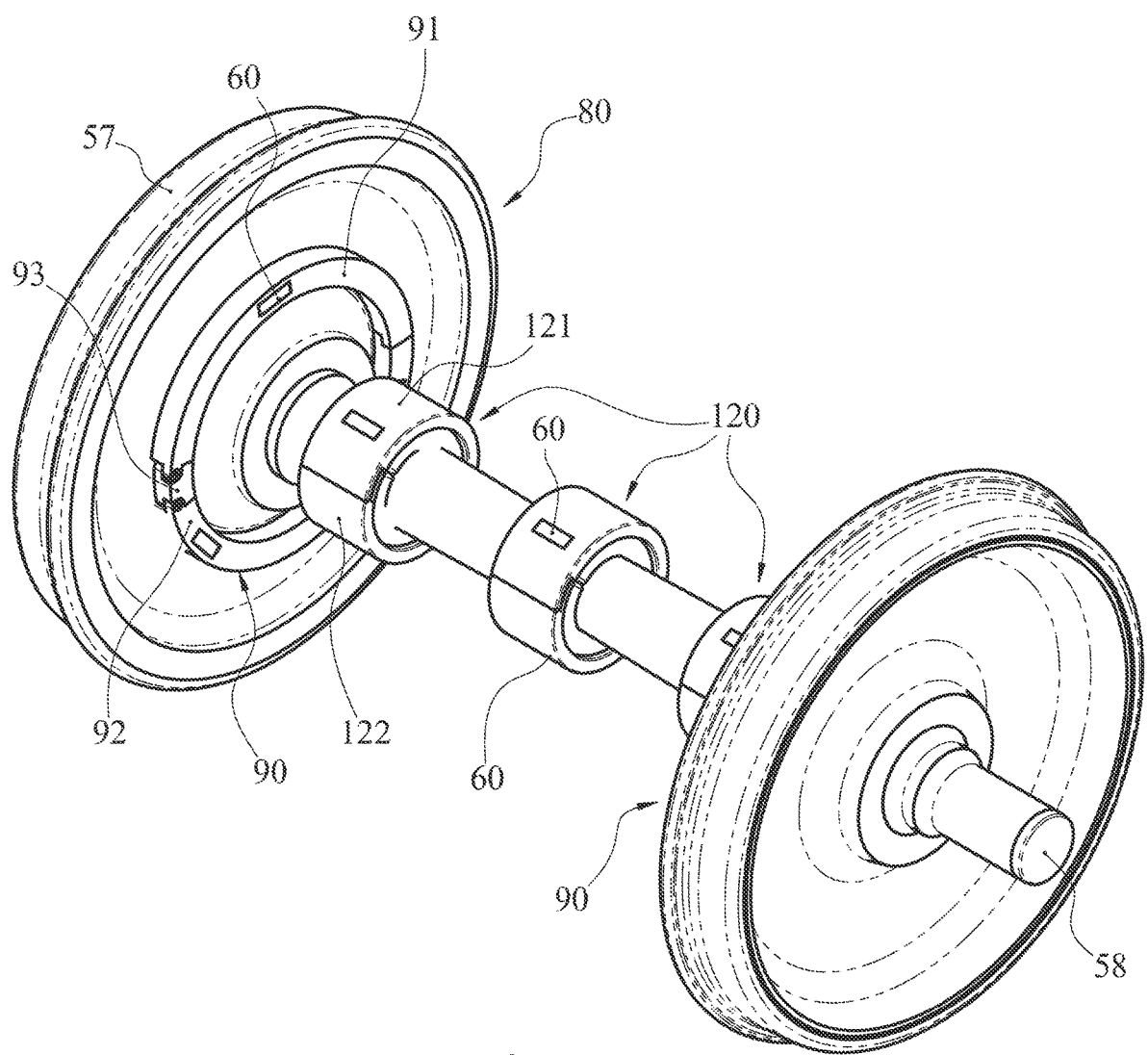
FIGS. 7A and 7B are different views of the bogie wheelset showing another axle-mounted embodiment that includes multiple apparatuses applied to the axle.
Figure 7B:
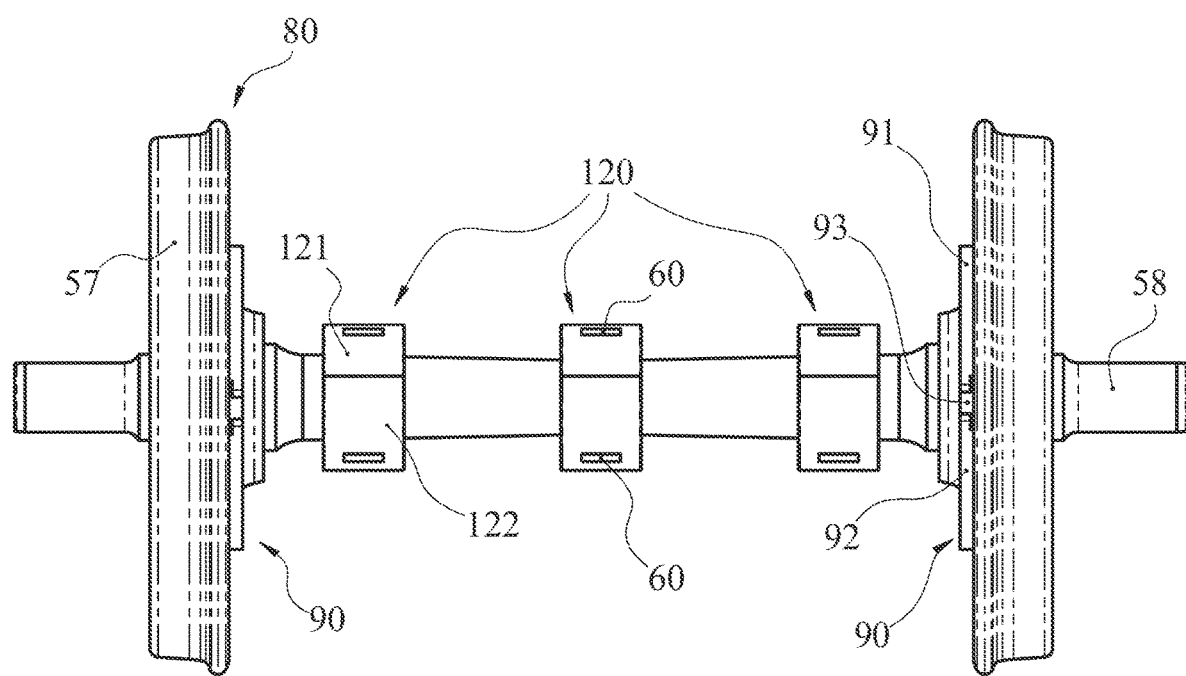

FIGS. 7A and 7B are two views that show another embodiment of an axle-mounted sensor cuff apparatus, namely, the split axle-mounted sensor cuff 120. For clarity, the embodiment that uses the split axle-mounted sensor cuff 120 employs a plurality of identical split axle-mounted sensor cuffs 120, such as three per axle as shown in the figures. Thus, the apparatus of this embodiment comprises a plurality of split axle-mounted sensor cuffs 120 configured to be spaced along the axle 58 of the railcar wheelset 80. Each split axle-mounted sensor cuff 120 includes a male side 121 and a female side 122 with corresponding spacers as further described below. Each split axle-mounted sensor cuff 120 is also interchangeably referred to herein as a "cylinder cuff," and the set of such cuffs is also referred to herein as an "assembly of cylinder cuffs" or an "assembly of split axle-mounted sensor cuffs 120."

The split axle-mounted sensor cuff 120 is just wide enough to hold one set of sensors 60, spread evenly around the cuff 120 every 120 degrees. This configuration results in one IMU being mounted to the female side 122 and two IMU's for each set being mounted to the male side 121. However, the configuration may also be reversed wherein two IMU's are mounted to the female side 122 and one IMU is mounted to the male side 121. The split axle-mounted sensor cuff 120 is designed for multiple sets of sensors to be placed on the axle 58 at variable distances, as opposed to the single axle-mounted sensor cuff 100 with its fixed distance and only two sets of sensors. FIG. 7B shows the use of three split axle-mounted sensor cuffs 120 equally spaced along the axle 58. The design of the split axle-mounted sensor cuff 120 allows for sensors to be placed closer to the wheels 57, if desired, as well as for the system to be placed on different gauge tracks or on axles with obstructions such motors. The IMU's 60 are preferably mounted inside of respective recesses of the male and female sides 121 and 122, or are mounted flush against the outer surfaces of the male and female sides 121 and 122. The IMU's 60 are also preferably positioned in the same plane perpendicular to the axle 58 of the railcar wheelset 80.

Figure 8A:
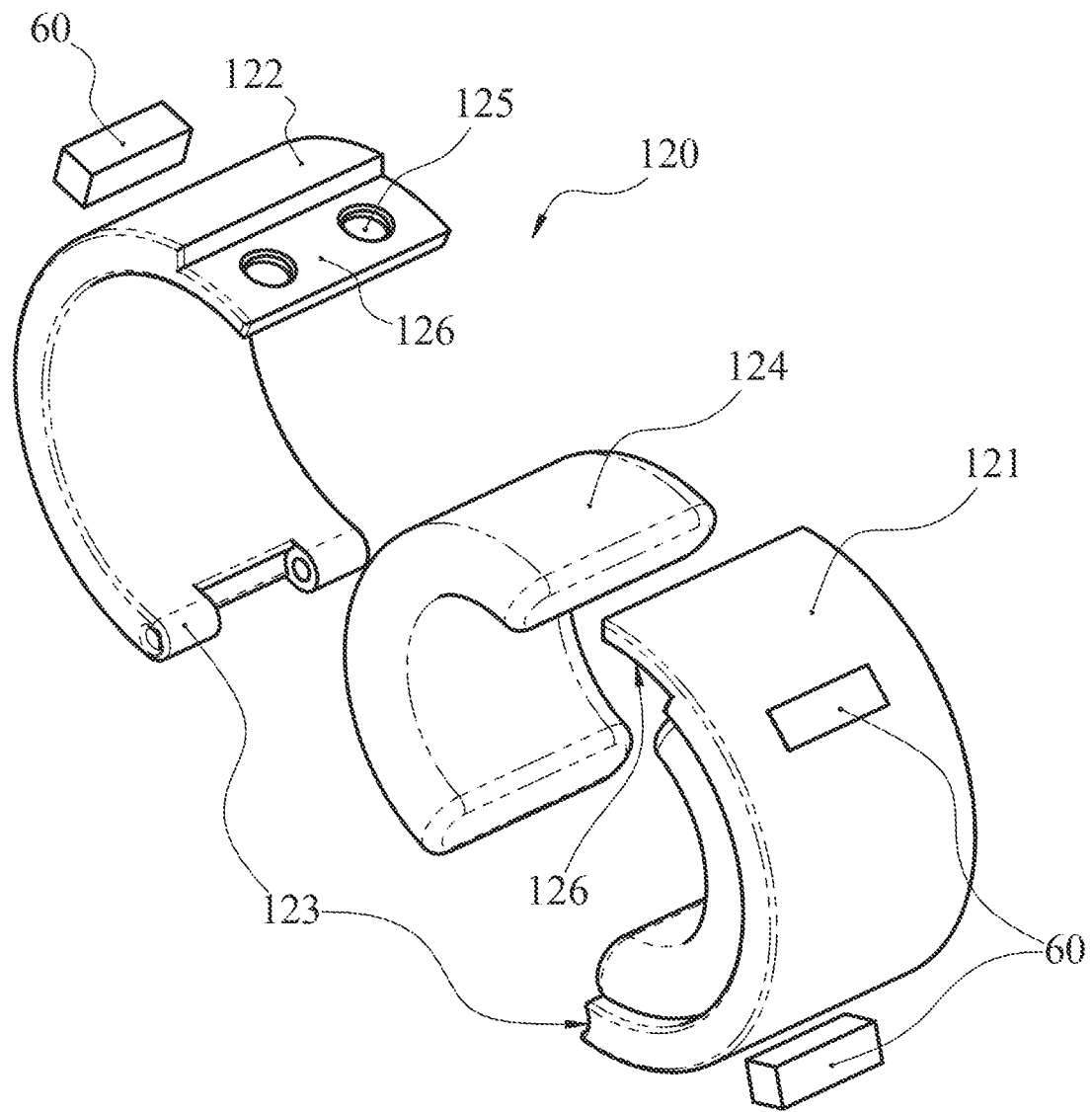
FIG. 8A is a component view of one of the multiple apparatuses applied to the axle as shown in FIGS. 7A and 7B.
Figure 8B:
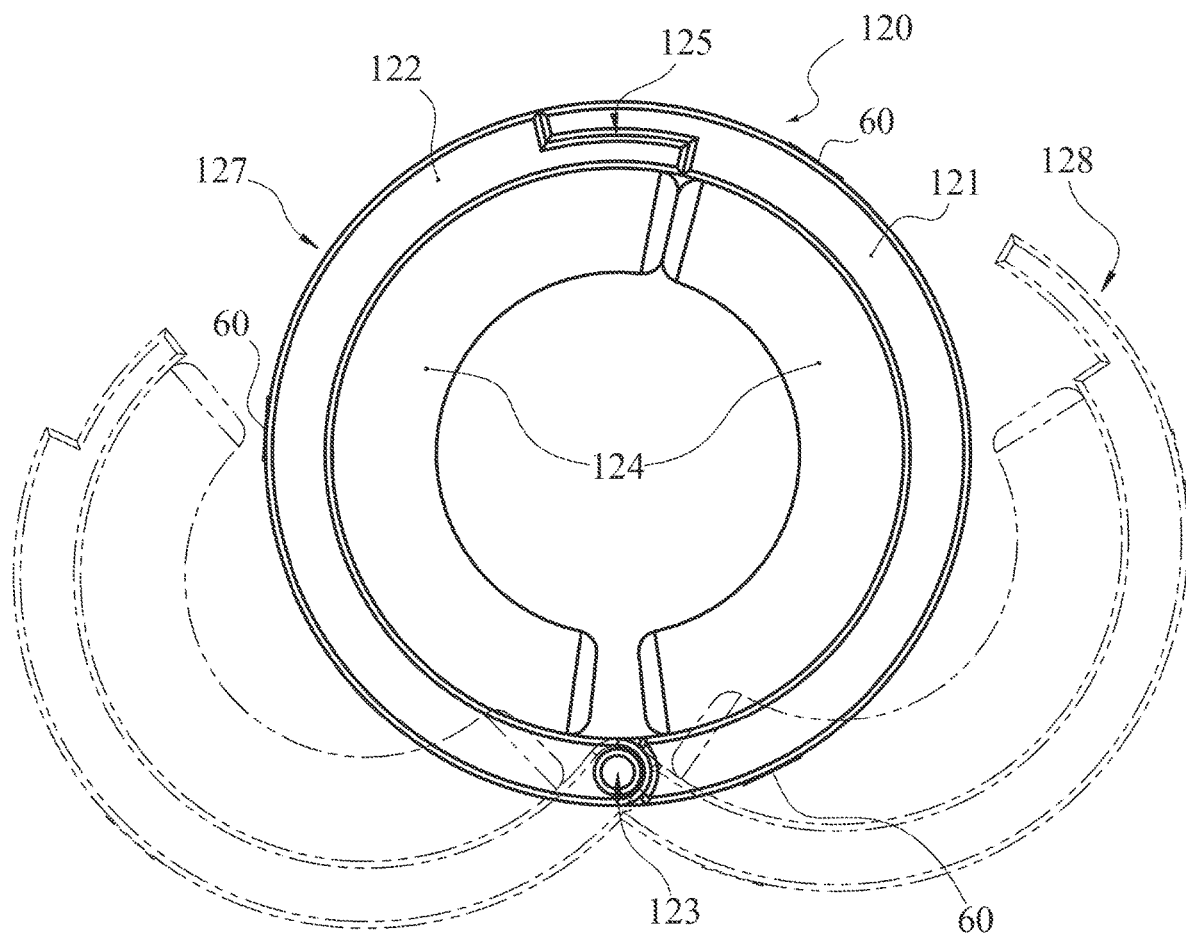
FIG. 8B is a component view of one of the multiple apparatuses shown in FIG. 8A applied to the axle in its closed and open states which would open to allow for the apparatus to go around the axle.

FIGS. 8A and 8B are views of the split axle-mounted sensor cuff 120 in an exploded view to show its components. The split axle-mounted sensor cuff 120 is similar to the single axle-mounted cuff 100, and is composed of a male side 121 and a female side 122 (interchangeably referred to herein as "a first half cylinder cuff portion 121" and "a second half cylinder cuff portion 122, respectively), a hinge 123, a compressible spacer 124, and clamping magnets 125 strong enough for the cuff 120 to remain closed while in operation. Similar to the single axis-mounted sensor cuff 100, one end of each of the male and female sides 121 and 122 has a lip region 126 along the edges. The lip regions 126 mate with each other to form a cylinder shape. The clamping magnets 125 are mounted in recesses of the lip regions 126. The clamping magnets 125 on the underside of the lip region 126 of the male side 121 are not visible in FIG. 8A.

FIG. 8B shows the cuff 120 in its closed 127 and open configurations 128. Similar to the single axis-mounted sensor cuff 100, the compressible spacer 124 of the split axle-mounted sensor cuff 120 is constructed of two parts (two halves), one part which fits against an inside surface of the male side 121, and another part which fits against an inside surface of the female side 122. The two halves are interchangeably referred to herein as "a first half cylinder cuff spacer" and "a second half cylinder cuff spacer."

Similar to the single axis-mounted sensor cuff 100, the combination of the compressible spacer 124 and the magnets 125 provide a friction-fit of the split axle-mounted sensor cuff 120 around the axle 58 so that the split axle-mounted sensor cuff 120 rotates with the axle 58 and does not slip with respect to the axle 58 during motion of the wheels 57. The compressible spacer 124 also acts as a dampening element to decrease sensor shock.

Similar to the cuff 100, when the cuff 120 is compressed into place around the axle 58, the compressible spacer 124 will have a radial diameter which depends upon its degree of compression. The compressible spacer 124 may thus be characterized as having a first thickness or first radial diameter in a completely uncompressed state, and a second thickness or second radial diameter in its most compressed state, and a range of thicknesses or radial diameters between the first and second thicknesses or radial diameters depending upon how much compression is applied when the cuff 120 is compressed into place around the axle 58.

Figure 9:
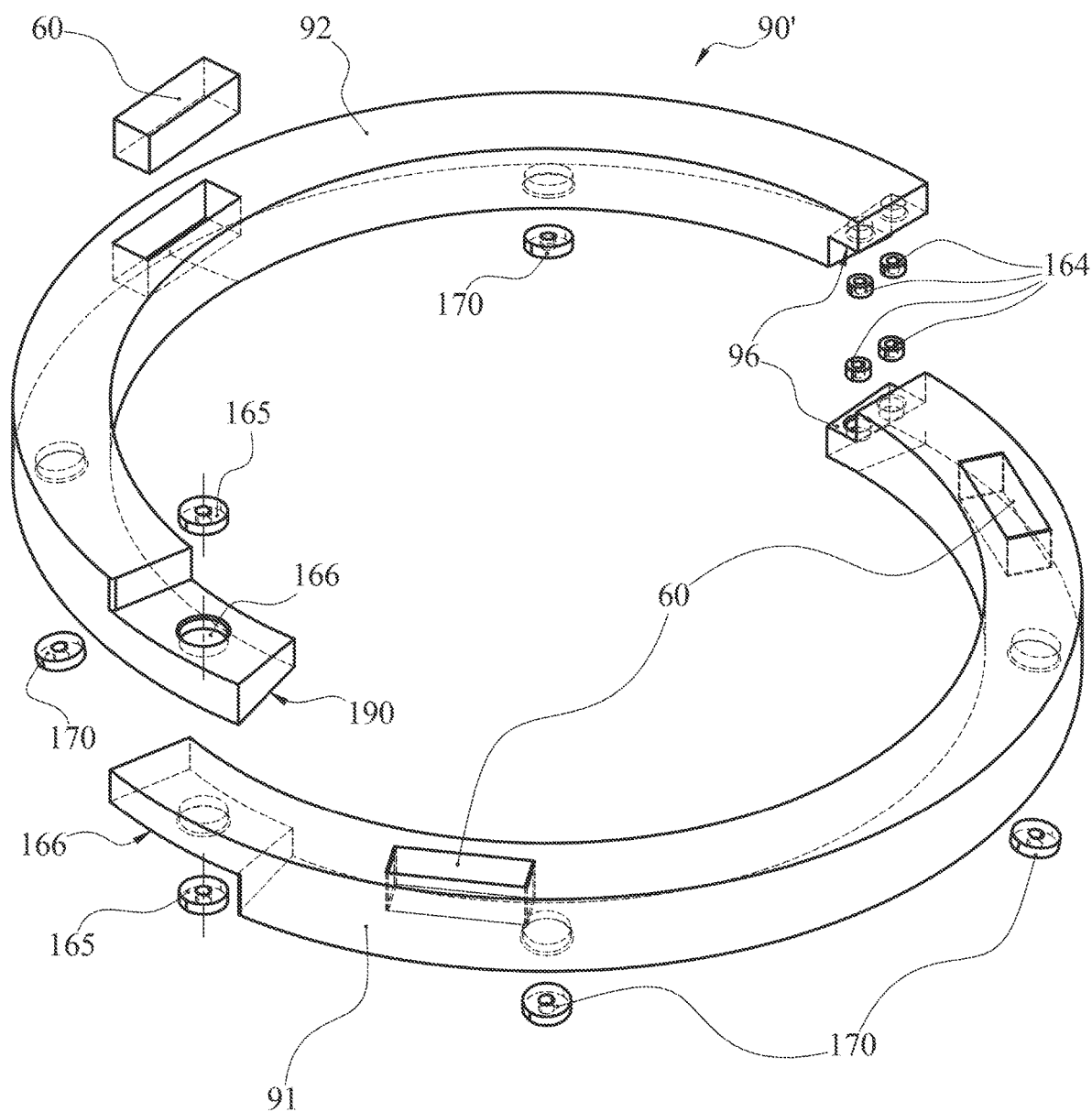
FIG. 9 is a view of an alternative wheel-mounted embodiment of the apparatus.

FIG. 9 shows an alternative embodiment of wheel-mounted sensor ring 90' with magnet attachments on both ends of the two sides, 91 and 92. Effectively, FIG. 9 shows an embodiment that uses magnets as shown in FIGS. 6A and 6C, but on both ends of the sides 91 and 92. Accordingly, the ring hinge 93 is replaced with a magnet clamp having similar structure to the magnet clamp 95 identified in FIG. 6A, namely, lip regions at the distal ends of the sides 91 and 92 which have magnets 165 mounted in recesses 166 thereof. FIG. 9 also shows that the sensor ring 90' has a curved edge (slant) denoted by 190 to flushly mate with the hub portion 180 of the wheel 57.

The single axle-mounted sensor cuff 100 and the split axle-mounted sensor cuffs 120 may also use magnet attachments on both ends of the cuff portions. A magnet hinge will be less secure than the physical hinges used in these embodiments due to the axle-related forces experienced on the sensor cuffs. However, in certain embodiments, it may be a suitable alternative, especially if the testing is done at low enough speeds so as to minimize the forces experienced on the sensor cuffs.

Figure 10:
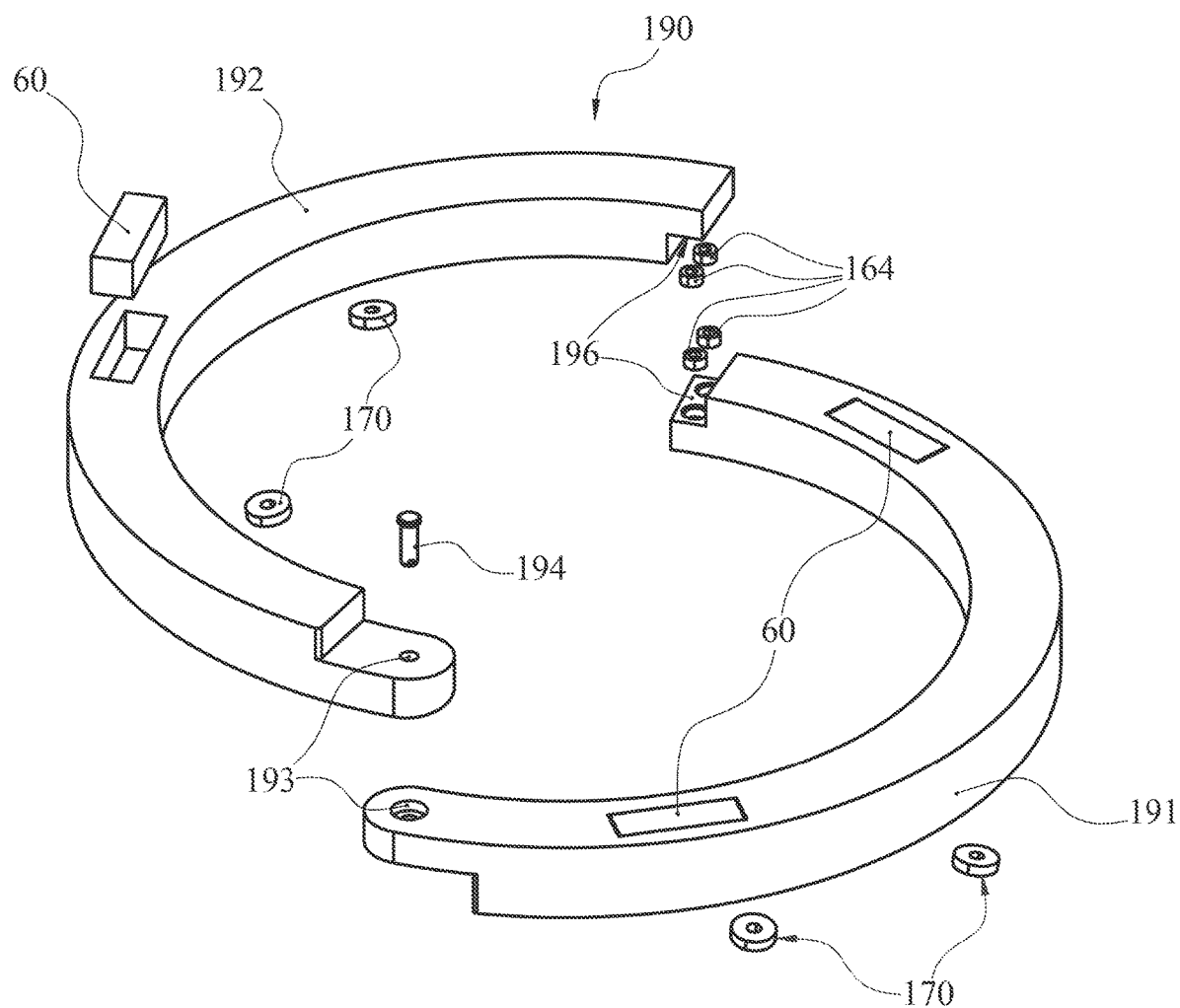
FIG. 10 is a view of another alternative wheel-mounted embodiment of the apparatus.

FIG. 10 shows an embodiment of the wheel-mounted sensor ring 190 having two sides 191 and 192, and which uses a single hinge 193 and hinge pin 194, instead of the double-hinged ring hinge 93, to attach one end of the two sides 191 and 192.

FIG. 11 shows an embodiment of the Data Synchronization of the whole system. The system can also be configured to monitor track condition. The figure shows two configurations of the system with differing sensor locations that could be used for track monitoring. The first configuration has the first two sensors on the same bogie, wheelset one 151 and wheelset two 152, with the third sensor on the first wheelset of the second bogie 153. As the distance 171 between the wheelsets on the first bogie is standard and known, and if the distance 172 between the last wheelset of the first bogie 152 and the first wheelset of the second bogie 153 is also known, then when an anomaly is detect in the first sensor and then again in the second sensor at the same location, calculated by the time delay, known velocity of the train and known distance 171 between sensors, the system can determine that an anomaly is a track anomaly and not a wheel or bogie anomaly. Then, using the known distance between the second and third wheelsets 172 and the velocity of the train, a camera can be mounted on the third wheelset 153 which can be used to take a high-resolution picture of the track for diagnostics and anomaly detection. The exact location and picture detailing the track condition can be reported to the conductor and track inspection authorities for maintenance and thorough inspection.

The second configuration in FIG. 13 is the same concept as the first configuration, with the second sensors placed on the first wheelset of the second bogie 153 instead of on the second wheelset of the first bogie 152. This leaves a larger distance between sensors 173 which allow for calculations and more assurance of anomalies in the track at high speeds. The camera would then be placed on the first wheelset of the bogie on the following car 154 and if the distance between the second bogie and the bogie on the next car is known 174, then the camera can capture the track condition for reporting.

II. Additional Considerations

1. Magnet Variations and Magnet Strengths

Regarding the magnets which join the two halves of the wheel-mounted sensor ring 90 and the single and split axle-mounted sensor cuffs 100 and 120, magnets of opposite poles which are aligned with each other may be used, as shown in the figures. Alternatively, one half of the wheel-mounted sensor ring 90 and one half of the single and split axle-mounted sensor cuffs 100 and 120 may have magnets, and the other half may have a strip of ferromagnetic metal.

The strength of the magnetics that join the two halves of the various embodiments should be strong enough to avoid separation of the two halves during motion of the railcar wheel on the track, but weak enough to allow for easy separation of the parts by a hand tool (e.g., a pry bar), attachment of an opposing weight, or by human hands during removal from the axle 58. Similar considerations exist for the magnets 170 on the underside (flip side) of the wheel-mounted sensor ring 90 that engage the hub portion of the railcar wheel 57, as shown in FIG. 6C.

2. Alternatives to Magnetic Attachment to Wheel for Wheel-Mounted Sensor Ring 90

The magnetic attachment embodiment is only one preferred structure for removably attaching the wheel-mounted sensor ring 90 to the wheel 57. The scope of the present invention includes other attachment mechanisms that rely upon physical (as opposed to magnetic) attachment of the wheel-mounted sensor ring 90 to the wheel 57, such as a clamp (e.g., a hook clamp or latch clamp), and other types of physical fastening mechanisms.

3. Use of IMU Data

As discussed above, any IMU may be used that has a form factor and durability suitable for the environment described herein, one suitable IMU being the IMU described in U.S. Pat. No. 10,284,752. Sample measured parameters that are used for calculating positional and vibrational anomalies during motion of the railcar wheels include, and which are captured by the IMU's include, but are not limited to, acceleration and angular rotation. The data captured by the IMU's may then be used for at least the following purposes:

i. Determine where there is a flat spot on the wheel (i.e., the location of the flat spot)

ii. Determine if the wheel has degraded to the point where the wheel cannot be corrected by repair, such as by machining down the wheel.

iii. Determine if and where there is an anomaly in the track.

4. Sample Construction Materials for Cuffs and Cuff Spacers

The construction materials for the two halves of the wheel-mounted sensor ring 90 and the single and split axle-mounted sensor cuffs 100 and 120 should be made of material that is sufficiently strong to withstand the train undercarriage environment, while also providing for long life. Suitable materials include polyoxymethylene (also known as acetal, polyacetal, and polyformaldehyde, and having a branded name of Delrin®), aluminum, reinforced carbon fiber, or 3D printed carbon fiber, as well as other durable and lightweight materials that can withstand the train undercarriage environment.

The construction materials for the cuff spacer require selection of materials that are both durable and compressible within a range of compressibility to accommodate a predesired range of axle thicknesses. A highly compressible cuff spacer would allow the single and split axle-mounted sensor cuffs 100 and 120 to accommodate a greater range of axle diameters than a less compressible spacer. However, a highly compressible spacer will be less structurally secure than a less compressible spacer. One suitable construction material for the compressible cuff spacers 104 and 124 is rubber.

5. Hingeless Embodiment

In one alternative embodiment magnets are used to join both halves of the wheel-mounted sensor ring 90 and the single and split axle-mounted sensor cuffs 100 and 120. Accordingly, magnets would replace the various hinge configurations shown in the figures. The fully magnetic embodiments may use magnets of opposite poles or a magnet/ferromagnetic metal combination, as described above.

6. Number of Sensors

In use, various options are feasible with respect to the number of sensor devices mounted to wheelsets 80 of a bogie 50. If the sensor devices are connected to only one wheelset 80, three options are feasible as follows:
  i. Attach one wheel-mounted sensor ring 90 to each of the wheels 57 of the wheelset 80.
  ii. Attach one single axle-mounted sensor cuff 100, or one set of split axle-mounted sensor cuffs 120 (collectively referred to herein as "sensor cuff" embodiments).
  iii. Option i and option ii, collectively.

The wheel-mounted sensor ring 90 will identify the vibrational anomalies for the wheel 57 that it is attached to. The wheel-mounted sensor ring 90 may pick up other vibrations from the opposite wheel 57 on the same wheelset 80 but it will still provide the information that will be needed to correct the vibrations for the wheel 57 that it is attached to. Accordingly, it is preferred to attach a wheel-mounted sensor ring 90 to every wheel 57 that is desired to be monitored.

The sensor cuff embodiments should be able to detect vibrational anomalies from the wheels 57 on either side of the axle 58, as well as from sources other than the wheels 57. Accordingly, one of the sensor cuff embodiments would need to be attached to each axle 58 of a bogie 50 so as to fully analyze the bogie 50. The sensor cuff embodiments may be used in place of the wheel-mounted sensor rings 90 to detect vibrations for both wheels 57 of a wheelset 80. However, since the IMU's in the sensor cuff embodiments are farther away from the wheels 57 than the IMU's of the wheel-mounted sensor rings 90, the signals picked up by the IMU's of the sensor cuff embodiments will be weaker than the signals picked up by the IMU's of the wheel-mounted sensor rings 90. Accordingly, it may be preferable to use option iii described above, namely, option i and option ii, collectively.

Stated simply, sensor devices should be attached to any location that is desired to be monitored, whether it is a single wheel 57, both wheels 57 of a wheelset 80 (using option i and/or option ii), or the entire bogie 50. If the desire is to monitor the entire bogie 50 and not just an isolated wheel/axle, preferred options would be option i or option ii described above for each wheelset 80 of the bogie 50. For the best picture or understanding of the sources of vibrational anomalies, the preferred option would be option iii described above, namely, option i and option ii, collectively, for each wheelset 80 of the bogie 50 which would require four wheel-mounted sensor rings 90 and two sensor cuff embodiments.

7. No Cuff Spacers

As discussed above, the compressible cuff spacers perform multiple beneficial functions, namely, that they allow the axle-mounted cuff embodiments to fit axles having different diameters while also providing a dampening function. However, in one alternative embodiment of the single and split axle-mounted sensor cuffs 100 and 120, no compressible cuff spacer is used. This alternative embodiment limits the use of the cuffs 100 and 120 to only one diameter of axles since the cuffs 100 and 120 would need to have an inner diameter that allows them to make a precise friction fit against the axle. No dampening benefit would exist in such an embodiment. However, in certain scenarios, this may be an acceptable tradeoff to simplifying construction and installation of the cuffs 100 and 120 on a fleet of railroad cars having wheelset axles of the same diameter. Alternatively, the sensor cuff material itself may provide dampening.

8. Vibrational Anomalies

In one preferred embodiment, the anomalies are vibrational anomalies associated with railcar wheels of the railcar wheelset, or the railcar bogie assembly that the railcar wheelset is part of. In another preferred embodiment, the anomalies are anomalies associated with the track.

9. Sensors

In one preferred embodiment, the sensors are IMU's, as described above. However, in alternative embodiments, other types of sensors may be used which are not IMU's, and the scope of the invention includes other types of sensors. Accordingly, IMU 60 is more generically referred to as "sensor 60."

Furthermore, in certain embodiments, it may sufficient to attach only one sensor to the entire apparatus (sensor device), in which case there would not be sensors attached to both of the male and female portions of the ring or cuff embodiments.

III. Summary of Preferred Embodiments

1. Wheel-Mounted Embodiments

One preferred wheel-mounted embodiment provides for an apparatus configured to be removably attachable to a hub portion of a railcar wheel of a railcar wheelset for use in determining anomalies associated with the railcar wheel, or a railcar bogie assembly that the railcar wheelset is part of, or a track, during motion of the railcar wheelset on a track. The apparatus includes at least the following components:
(a) A first semicircular portion having distal ends. The first semicircular portion has a half-ring shape, and has an outer sidewall surface and an inner sidewall surface.
(b) A second semicircular portion having distal ends. The first semicircular portion also has a half-ring shape, and also has an outer sidewall surface and an inner sidewall surface.

(c) A fastener located at each of the distal ends of the first semicircular portion, and a fastener located at each of the distal ends of the second semicircular portion. The fasteners allow the first semicircular portion and the second semicircular portion to attach to each other (become secured to each other) at their respective distal ends to form a circular ring or disk.

(d) One or more magnets fixedly attached to the inner sidewall surface of the first semicircular portion, and one or more magnets fixedly attached to the inner sidewall surface of the second semicircular portion, the magnets allowing for the apparatus to be removably attached to the hub portion of the railcar wheel.

(e) One or more sensors mounted to the first semicircular portion, and one or more sensors mounted to the second semicircular portion. The sensors are configured to measure parameters that are used for determining the anomalies during motion of the railcar wheel on the track.

In one preferred embodiment, the sensors are inertial measurement units (IMU's).

The fastener located at one of the distal ends of the respective first and second semicircular portions may be a hinge which joins one of the distal ends of the respective first and second semicircular portions to each other. The hinge allows the first and second semicircular portions to pivot open and closed so as to removably attach the apparatus to the hub portion of a railcar wheel. The fastener located at the other one of the distal ends of the respective first and second semicircular portions may be magnets of opposite poles which face each other. The magnets secure the other one of the distal ends of the respective first and second semicircular portions to each other when the first and second semicircular portions are pivoted to a fully closed position.

In an alternative embodiment, the fastener located at both of the distal ends of the respective first and second semicircular portions are magnets of opposite poles which face each other.

The hinge may be a single hinge which may use a single hinge pin, as shown in FIG. 10. Alternatively, the hinge may form part of the circular ring and have two ends (e.g., ring hinge 93). In this embodiment, the fastener includes a first hinge pin and a second hinge pin. The hinge is attached at one end to a distal end of the first semicircular portion by the first hinge pin, and is attached at the other end to a distal end of the second semicircular portion by the second hinge pin. The first and second hinges allow the first and second semicircular portions to pivot open and closed so as to removably attach the apparatus to the hub portion of a railcar wheel.

The first and second semicircular portions may each include one or more recesses for receiving the sensors mounted thereto. The apparatus preferably includes three sensors, wherein one sensor is mounted to the first semicircular portion, and two sensors are mounted to the second semicircular portion, each sensor being mounted in a location on the first or second semicircular portion so as to be 120 degrees apart from an adjacent sensor.

2. Axle-Mounted Embodiments

One preferred axle-mounted embodiment provides for an apparatus configured to be removably attachable to an axle of a railcar wheelset for use in determining anomalies associated with railcar wheels of the railcar wheelset, or a railcar bogie assembly that the railcar wheelset is part of, or a track, during motion of the railcar wheelset on a track. The apparatus includes at least the following components:

(a) A first half cylinder cuff portion having distal ends along its longitudinal axis, and having an outer sidewall surface and an inner sidewall surface.

(b) A second half cylinder cuff portion having distal ends along its longitudinal axis, and having an outer sidewall surface and an inner sidewall surface.

(c) A fastener located at each of the distal ends of the first half cylinder cuff portion, and a fastener located at each of the distal ends of the second half cylinder cuff portion. The fasteners allow the first half cylinder cuff portion and the second half cylinder cuff portions to attach to each other at their respective distal ends to form a hollow cylinder.

(d) One or more sensors mounted to the first half cylinder cuff portion, and one or more sensors mounted to the second half cylinder cuff portion. The sensors are configured to measure parameters that are used for determining the anomalies during motion of the railcar wheel on the track.

In one preferred embodiment, the sensors are inertial measurement units (IMU's).

In one preferred embodiment, the apparatus further comprises cuff spacers. More specifically, the first and second half cylinder cuff portions each have inner and outer sidewall surfaces, and the apparatus further includes a first half cylinder cuff spacer having inner and outer sidewall surfaces, and a second half cylinder cuff spacer having inner and outer sidewall surfaces. The outer sidewall surfaces of the first and second half cylinder cuff spacers are adjacent to the inner sidewall surfaces of the respective first and second half cylinder cuff portions.

The fastener located at one of the distal ends of the respective first and second half cylinder cuff portions may be a hinge which joins one of the distal ends of the respective first and second half cylinder cuff portions to each other. The hinge allows the first and second half cylinder cuff portions to pivot open and closed so as to removably attach the apparatus to the hub portion of a railcar wheel. The fastener located at the other one of the distal ends of the respective first and second half cylinder cuff portions may be magnets of opposite poles which are aligned with each other. The magnets secure the other one of the distal ends of the respective first and second half cylinder cuff portions to each other when the first and second half cylinder cuff portions are pivoted to a fully closed position. There may be a plurality of magnets of opposite poles spaced longitudinally along the distal ends of the respective first and second half cylinder cuff portions and aligned with one another.

In the single axle-mounted sensor cuff embodiment, the apparatus includes two sets of three sensors, each set being located near each end of the first and second half cylinder cuff portions, each sensor being spaced 120 degrees apart from an adjacent sensor. In the split axle-mounted sensor cuff embodiment, the apparatus includes multiple sets of cuffs, each cuff including items (a)-(d) described above. However, the split axle-mounted sensor cuff embodiment preferably includes only one set of three sensors spaced in the same manner as the single axle-mounted sensor cuff embodiment, namely, each sensor is spaced 120 degrees apart from an adjacent sensor.

Another preferred axle-mounted embodiment provides for an apparatus configured to be removably attachable to an axle of a railcar wheelset for use in determining anomalies associated with railcar wheels of the railcar wheelset, or a railcar bogie assembly that the railcar wheelset is part of, or a track, during motion of the railcar wheelset on a track. The apparatus includes a plurality or assembly of cylinder cuffs configured to be spaced along the axle of the railcar wheelset. Each cylinder cuff includes at least the following components:

(a) A first half cylinder cuff portion having distal ends along its longitudinal axis, and having an outer sidewall surface and an inner sidewall surface.

(b) A second half cylinder cuff portion having distal ends along its longitudinal axis, and having an outer sidewall surface and an inner sidewall surface.

(c) A fastener located at each of the distal ends of the first half cylinder cuff portion, and a fastener located at each of the distal ends of the second half cylinder cuff portion. The fasteners allow the first half cylinder cuff portion and the second half cylinder cuff portion to attach to each other at their respective distal ends to form a hollow cylinder.

(d) One or more sensors are mounted to the first half cylinder cuff portion, and one or more sensors are mounted to the second half cylinder cuff portion. The sensors are configured to measure parameters that are used for determining the anomalies during motion of the railcar wheelset on the track.

In one preferred embodiment, the sensors are inertial measurement units (IMU's).

In one preferred embodiment, the apparatus includes three cylinder cuffs.

In one preferred embodiment, each cylinder cuff includes three sensors and each sensor is mounted in a location on the first or second half cylinder portion so as to be 120 degrees apart from an adjacent sensor.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An apparatus configured to be removably attachable to an axle of a railcar wheelset for use in determining anomalies associated with railcar wheels of the railcar wheelset, or a railcar bogie assembly that the railcar wheelset is part of, or a track, during motion of the railcar wheelset on a track, the apparatus comprising:
   (a) a first half cylinder cuff portion having distal ends along its longitudinal axis, and having an outer sidewall surface and an inner sidewall surface;
   (b) a second half cylinder cuff portion having distal ends along its longitudinal axis, and having an outer sidewall surface and an inner sidewall surface;
   (c) a fastener located at each of the distal ends of the first half cylinder cuff portion, and a fastener located at each of the distal ends of the second half cylinder cuff portion, the fasteners allowing the first half cylinder cuff portion and the second half cylinder cuff portions to attach to each other at their respective distal ends to form a hollow cylinder; and
   (d) one or more sensors mounted to the first half cylinder cuff portion, and one or more sensors mounted to the second half cylinder cuff portion, the sensors being configured to measure parameters that are used for determining the anomalies during motion of the railcar wheel on the track.

2. The apparatus of claim 1 wherein the fastener located at one of the distal ends of the respective first and second half cylinder cuff portions is a hinge which joins one of the distal ends of the respective first and second half cylinder cuff portions to each other, the hinge allowing the first and second half cylinder cuff portions to pivot open and closed so as to removably attach the apparatus to the hub portion of a railcar wheel.

3. The apparatus of claim 2 wherein the fastener located at the other one of the distal ends of the respective first and second half cylinder cuff portions are magnets of opposite poles which are aligned with each other, the magnets securing the other one of the distal ends of the respective first and second half cylinder cuff portions to each other when the first and second half cylinder cuff portions are pivoted to a fully closed position.

4. The apparatus of claim 2 wherein there are a plurality of magnets of opposite poles spaced longitudinally along the distal ends of the respective first and second half cylinder cuff portions and aligned with one another.

5. The apparatus of claim 1 wherein the apparatus includes two sets of three sensors, each set being located near each end of the first and second half cylinder cuff portions, each sensor being spaced 120 degrees apart from an adjacent sensor.

6. The apparatus of claim 5 wherein the three sensors of each set are positioned in the same plane perpendicular to an axle of the railcar wheelset.

7. The apparatus of claim 1 wherein the sensors are inertial measurement units (IMU's).

8. The apparatus of claim 1 wherein the first and second half cylinder cuff portions each have inner and outer sidewall surfaces, the apparatus further comprising:
   (e) a first half cylinder cuff spacer having inner and outer sidewall surfaces; and
   (g) a second half cylinder cuff spacer having inner and outer sidewall surfaces,
      wherein the outer sidewall surfaces of the first and second half cylinder cuff spacers are adjacent to the inner sidewall surfaces of the respective first and second half cylinder cuff portions.

9. The apparatus of claim 1 wherein the anomalies are vibrational anomalies associated with railcar wheels of the railcar wheelset, or the railcar bogie assembly that the railcar wheelset is part of.

10. An apparatus configured to be removably attachable to an axle of a railcar wheelset for use in determining anomalies associated with railcar wheels of the railcar wheelset, or a railcar bogie assembly that the railcar wheelset is part of, or a track, during motion of the railcar wheelset on a track, the apparatus comprising a plurality of cylinder cuffs configured to be spaced along the axle of the railcar wheelset, each cylinder cuff including:
   (a) a first half cylinder cuff portion having distal ends along its longitudinal axis, and having an outer sidewall surface and an inner sidewall surface;
   (b) a second half cylinder cuff portion having distal ends along its longitudinal axis, and having an outer sidewall surface and an inner sidewall surface;
   (c) a fastener located at each of the distal ends of the first half cylinder cuff portion, and a fastener located at each of the distal ends of the second half cylinder cuff portion, the fasteners allowing the first half cylinder cuff portion and the second half cylinder cuff portion to attach to each other at their respective distal ends to form a hollow cylinder; and
   (d) one or more sensors mounted to the first half cylinder cuff portion, and one or more sensors mounted to the second half cylinder cuff portion, the sensors being configured to measure parameters that are used for determining the anomalies during motion of the railcar wheelset on the track.

11. The apparatus of claim 10 wherein each cylinder cuff includes three sensors, each sensor being mounted in a location on the first or second half cylinder portion so as to be 120 degrees apart from an adjacent sensor.

12. The apparatus of claim 11 wherein the three sensors are positioned in the same plane perpendicular to an axle of the railcar wheelset.

13. The apparatus of claim 10 wherein the sensors are inertial measurement units (IMU's).

14. The apparatus of claim 10 wherein the first and second half cylinder cuff portions of each cylinder cuff each have inner and outer sidewall surfaces, each cylinder cuff further comprising:
   (e) a first half cylinder cuff spacer having inner and outer sidewall surfaces; and
   (g) a second half cylinder cuff spacer having inner and outer sidewall surfaces,
      wherein the outer sidewall surfaces of the first and second half cylinder cuff spacers are adjacent to the inner sidewall surfaces of the respective first and second half cylinder cuff portions.

15. The apparatus of claim 10 wherein the apparatus comprises three cylinder cuffs.

16. The apparatus of claim 10 wherein the anomalies are vibrational anomalies associated with railcar wheels of the railcar wheelset, or the railcar bogie assembly that the railcar wheelset is part of.

\* \* \* \* \*